US008045625B2

(12) United States Patent
Seo

(10) Patent No.: US 8,045,625 B2
(45) Date of Patent: Oct. 25, 2011

(54) ENCODING AND DECODING METHOD TO CONTROL A DIRECT CURRENT (DC) COMPONENT, AND DATA PROCESSING APPARATUS PERFORMING THE SAME

(75) Inventor: Il-Won Seo, Gyeonggi-do (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1120 days.

(21) Appl. No.: 11/830,139

(22) Filed: Jul. 30, 2007

(65) Prior Publication Data

US 2008/0031364 A1 Feb. 7, 2008

(30) Foreign Application Priority Data

Aug. 1, 2006 (KR) .................. 10-2006-0072444

(51) Int. Cl.
*H04B 14/04* (2006.01)
(52) U.S. Cl. .................. 375/243; 375/244; 375/254
(58) Field of Classification Search .......... 375/242, 375/241, 245, 256, 246, 253; 341/58, 59, 341/73
See application file for complete search history.

(56) References Cited

U.S. PATENT DOCUMENTS

| | | | | |
|---|---|---|---|---|
| 3,930,234 A | * | 12/1975 | Queisser et al. | 711/111 |
| 3,994,014 A | * | 11/1976 | Burgiss | 360/42 |
| 4,211,997 A | * | 7/1980 | Rudnick et al. | 714/758 |
| 5,444,490 A | * | 8/1995 | de With et al. | 375/240.01 |
| 5,818,371 A | * | 10/1998 | Lu et al. | 341/122 |
| 6,225,921 B1 | * | 5/2001 | Kahlman et al. | 341/58 |
| 6,950,042 B2 | * | 9/2005 | Nakagawa et al. | 341/58 |
| 2002/0085644 A1 | * | 7/2002 | Hayami et al. | 375/271 |
| 2006/0045466 A1 | * | 3/2006 | Sasaki et al. | 386/52 |
| 2006/0282457 A1 | * | 12/2006 | Williams | 707/102 |

FOREIGN PATENT DOCUMENTS

| | | |
|---|---|---|
| JP | 9-162857 | 6/1997 |
| JP | 2004-187320 | 7/2004 |
| KR | 10-294893 | 4/2001 |

* cited by examiner

*Primary Examiner* — Khanh C Tran
*Assistant Examiner* — Qutbuddin Ghulamali
(74) *Attorney, Agent, or Firm* — Stanzione & Kim, LLP

(57) ABSTRACT

An encoding method includes partitioning an input stream into first sub-blocks and second sub-blocks, encoding the second sub-blocks based on a number and location of reference sub-blocks to generate third sub-blocks when at least one of the first sub-blocks corresponds to a forbidden pattern, and rearranging the first sub-blocks and the third sub-blocks to generate an output stream. The reference sub-blocks indicate the second sub-blocks that correspond to a reference pattern and the third sub-blocks includes a redundant information sub-block and non-redundant information sub-blocks. Thus, the encoding method may properly control a direct current (DC) component.

35 Claims, 12 Drawing Sheets

FIG. 6

| [3] | [2] | [1] | [0] |
|-----|-----|-----|-----|
| 0 | 0 | 0 | 0 |
| 1 | 1 | 1 | 1 |
| 0 | 1 | 0 | 1 |
| 1 | 0 | 1 | 0 |

FIG. 7

| | INDEX | N2 | N1 | N0 | NON-INVERSION | INVERSION |
|---|---|---|---|---|---|---|
| NO BOUNDARY VIOLATION | 1 | x | x | x | E0={N2[3:2],c(0),N2[1:0]}<br>E1=N1<br>E2=N0 | E0={~N2[3:2],c(1),~N2[1:0]}<br>E1=~N1<br>E2=~N0 |
| BOUNDARY VIOLATION | 2 | 0 | 0 | 0 | E0={N2[3:2],c(0),N2[1:0]}<br>E1=N1<br>E2=N0 | NONE |
| | 3 | 0 | 0 | 1 | E0={id(0),i(0),c(1),lo(01)}<br>E1=N1<br>E2=N1 | E0={id(0),i(1),c(1),lo(01)}<br>E1=~N2<br>E2=~N1 |
| | 4 | 0 | 1 | 0 | E0={id(0),i(0),c(1),lo(10)}<br>E1=N2<br>E2=N0 | E0={id(0),i(1),c(1),lo(10)}<br>E1=~N2<br>E2=~N0 |
| | 5 | 0 | 1 | 1 | E0={id0(1),i(0),c(1),fix(0),id1(0)}<br>E1={fix(0),lo(01),fix(1)}<br>E2=N2 | E0={id0(1),i(1),c(1),fix(0),id1(0)}<br>E1={fix(0),lo(01),fix(1)}<br>E2=~N2 |
| | 6 | 1 | 0 | 0 | E0={id(0),i(0),c(1)lo(11)}<br>E1=N1<br>E2=N0 | E0={id(0),i(1),c(1)lo(11)}<br>E1=~N1<br>E2=~N0 |
| | 7 | 1 | 0 | 1 | E0={id0(1),i(0),c(1),fix(0),id1(0)}<br>E1={fix(1),lo(10),fix(0)}<br>E2=N1 | E0={id0(1),i(1),c(1),fix(0),id1(0)}<br>E1={fix(1),lo(10),fix(0)}<br>E2=~N1 |
| | 8 | 1 | 1 | 0 | E0={id0(1),i(0),c(1),fix(0),id1(0)}<br>E1={fix(1),lo(11),fix(0)}<br>E2=N0 | E0={id0(1),i(1),c(1),fix(0),id1(0)}<br>E1={fix(1),lo(11),fix(0)}<br>E2=~N0 |
| | 9 | 1 | 1 | 1 | E0={id0(1),fix(1),c(1),fix(0110)}<br>E1={fix(0110)}<br>E2={fix(0110)} | NONE |

INVERSION

RDS VALUE

RDS VALUE

INVERSION

RDS VALUE

RDS VALUE

INVERSION

RDS VALUE

RDS VALUE

ENCODING AND DECODING METHOD TO CONTROL A DIRECT CURRENT (DC) COMPONENT, AND DATA PROCESSING APPARATUS PERFORMING THE SAME

CROSS-REFERENCE TO RELATED APPLICATIONS

This application claims priority under 35 USC §119 from Korean Patent Application No. 2006-72444, filed on Aug. 1, 2006 in the Korean Intellectual Property Office (KIPO), the disclosure of which is incorporated herein in its entirety by reference.

BACKGROUND OF THE INVENTION

1. Field of the Invention

The present general inventive concept relates to data processing, and more particularly to encoding and decoding methods to control a direct current (DC) component, and data processing apparatuses performing the encoding and decoding methods.

2. Description of the Related Art

Data information may be transmitted through a network, a microwave or a satellite transmission in a receivable form to a receiving apparatus. Also, the data information may be stored into standard storage media, such as a compact disc (CD), a digital video disc (DVD), a digital audio tape (DAT) and a hard disk.

Generally, the data is represented as digital data, and the digital data is rarely transmitted or stored in an original form. Instead, the data is compressed to reduce a size of the data or encoded to reduce data errors (e.g., channel encoding).

A compression performance is determined by a ratio of compressed digital data to original digital data, and a channel coding performance is determined by a size of redundant information and an error recovery ratio. The redundant information includes additional information lacking in the original digital data to recover the original digital data from the channel-coded data.

In an example of hard disk channel coding, recent hard disk coding methods are classified as either a modified frequency modulation (MFM) method or a run length limited (RLL) method. The RLL method has better compression performance and is safer than the MFM method.

The RLL method uses a code defining minimum and maximum distances of a transition between a bit '0' and a bit '1', and may add the redundant information in the original digital data due to limitations of the minimum and maximum distances. An RLL code generated by the RLL method is often referred to as a (d, k) code where d indicates the minimum distance and k indicates the maximum distance.

For example, the CD may have an 8/17 rate and adopt an eight-to-fourteen modulation (EFM) code, of which a minimum distance d is equal to 2 and a maximum distance k is equal to 10. The DVD may have an 8/16 rate and adopt an EFMPlus code, of which a minimum distance d is equal to 2 and a maximum distance k is equal to 10.

Also, storing methods of the hard disk may be classified as either a longitudinal magnetic recording (LMR) method or a perpendicular magnetic recording (PMR) method. The PMR method may store data 10 times more than the LMR method in the same storage media. However, the PMR method has a problem in that the digital data stored in the storage media is unstable when a direct current (DC) component is not properly controlled.

Nowadays, research is being conducted on using the RLL method and the PMR method to store the digital data.

A low-rate RLL method using a lot of the redundant information may properly control the DC component generated when the storage media such as the hard disk adopts the PMR method but may seriously reduce a storage density. Generally, the storage density of the storage media is an important factor and the low-rate RLL method may not be adequate.

A high-rate RLL method using only some of the redundant information may not significantly change the storage density but may not properly control the DC component that is generated when the storage media such as the hard disk adopts the PMR method. Generally, reliability of the digital data stored in the storage media is also an important factor and thus the high-rate RLL method may not be adequate if the DC component is not properly controlled.

Therefore, encoding and decoding methods capable of not significantly changing the storage density and properly controlling the DC component are required.

SUMMARY OF THE INVENTION

The present general inventive concept is provided to substantially obviate one or more problems due to limitations and disadvantages of the related art.

The present general inventive concept provides an encoding method to control a direct current (DC) component.

The present general inventive concept also provides a decoding method.

The present general inventive concept also provides data processing apparatuses to perform the encoding and decoding methods.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an encoding method includes partitioning an input stream into first sub-blocks and second sub-blocks, encoding the second sub-blocks based on a number and location of reference sub-blocks to generate third sub-blocks when at least one of the first sub-blocks corresponds to a forbidden pattern, and rearranging the first sub-blocks and the third sub-blocks to generate an output stream. The reference sub-blocks indicate the second sub-blocks that correspond to a reference pattern and the third sub-blocks includes a redundant information sub-block and non-redundant information sub-blocks.

The forbidden pattern may have characteristics such that the DC component is greater than a predetermined threshold when one of the first and second sub-blocks is encoded.

The reference pattern may correspond to a pattern with specific bit combinations capable of properly controlling the DC component when the second sub-blocks are encoded.

When the number of the reference sub-blocks corresponds to 1, encoding the second sub-blocks may include writing the number and location of the reference sub-blocks and an encoding state into the redundant information sub-block, the encoding state indicating that the second sub-blocks are encoded, and storing non-reference sub-blocks into the non-redundant information sub-blocks. The non-reference sub-blocks indicate the second sub-blocks that do not correspond to the reference pattern.

When the number of the reference sub-blocks is not less than 2 and not greater than the number of the second sub-blocks, encoding the second sub-blocks may further include writing the number and location of the reference sub-blocks and the encoding state into the redundant information sub-block and some of the non-redundant information sub-blocks, and writing the non-reference sub-blocks into others of the non-redundant information sub-blocks.

When the number of the reference sub-blocks is equal to the number of the second sub-blocks, encoding the second sub-blocks may further include writing the number of the reference sub-blocks and the encoding state into the redundant information sub-block, and replacing the non-redundant information sub-blocks into a predetermined pattern.

Encoding the second sub-blocks may further include inverting the others of the non-redundant information sub-blocks according to a predetermined standard.

Inverting the others of the non-redundant information sub-blocks may include inverting the non-redundant information sub-blocks when a total running digital sum (RDS) is greater than a positive value of a first threshold or a current RDS is greater than a positive value of a second threshold, inverting the non-redundant information sub-blocks when the total RDS is less than a negative value of the first threshold or the current RDS is less than a negative value of the second threshold, and writing an inversion state into the redundant information sub-block. The total RDS indicates an RDS of input streams received from a start time to a current time and the current RDS indicates an RDS of a current input stream.

When the number of the reference sub-blocks is equal to 0, encoding the second sub-blocks may include writing the second sub-blocks into the third sub-blocks, and writing a non-encoding state into the redundant information sub-block, the non-encoding state indicating that the second sub-blocks are not encoded.

The method may further include inverting the second sub-blocks according to a predetermined standard to generate the third sub-blocks when all of the first sub-blocks do not correspond to the forbidden pattern.

Inverting the second sub-blocks may include inverting the second sub-blocks to write the inverted second sub-blocks into the third sub-blocks when a total RDS is greater than a positive value of a first threshold or a current RDS is greater than a positive value of a second threshold, inverting the second sub-blocks to write the inverted second sub-blocks into the third sub-blocks when the total RDS is less than a negative value of the first threshold or the current RDS is less than a negative value of the second threshold, and writing an inversion state into the redundant information sub-block.

The foregoing and/or other aspects and utilities of the general inventive concept may also be achieved by providing a decoding method includes partitioning an encoded stream into first sub-blocks and third sub-blocks, the third sub-blocks including a redundant information sub-block and non-redundant information sub-blocks, decoding the third sub-blocks based on an encoding state in the redundant information sub-block to generate second sub-blocks when at least one of the first sub-blocks corresponds to the forbidden pattern, and rearranging the first sub-blocks and the second sub-blocks to generate a decoded stream. The encoding state indicates whether the second sub-blocks are encoded.

When the encoding state indicates that the third sub-blocks are encoded, decoding the third sub-blocks may include obtaining a number of the reference sub-blocks in the redundant information sub-block. The reference sub-blocks indicate the third sub-blocks that correspond to a reference pattern.

When the number of the reference sub-blocks corresponds to the number of the third sub-blocks, decoding the third sub-blocks may further include replacing each of the third sub-blocks into the reference pattern.

When the number of the reference sub-blocks is less than the number of the third sub-blocks, decoding the third sub-blocks may further include obtaining an inversion state from the redundant information sub-block, replacing some of the third sub-blocks into the reference pattern based on the number and location of the reference sub-blocks, the some of the third sub-blocks including the redundant information sub-block, and inverting others of the third sub-blocks based on the inversion state.

The method may further include writing the second sub-blocks based on the third sub-blocks except for the encoding state when the encoding state indicates that the third sub-blocks are not encoded.

The method may further include inverting the third sub-blocks based on an inversion state to generate the second sub-blocks when all of the first sub-blocks do not correspond to the forbidden pattern.

Inverting the third sub-blocks may include inverting the third sub-blocks except for the inversion state to generate the second sub-blocks when the inversion state indicates that the second sub-blocks are inverted, and non-inverting the third sub-blocks to generate the second sub-blocks when the inversion state indicates that the second sub-blocks are not inverted.

The foregoing and/or other aspects and utilities of the general inventive concept may also be achieved by providing a data processing apparatus to control a DC component includes a data source to provide an input stream, and an encoder to encode the input stream to generate an output stream. The encoder includes a partitioning unit to partition an input stream into first sub-blocks and second sub-blocks, an encoding unit to encode the second sub-blocks based on a number and location of reference sub-blocks to generate third sub-blocks when at least one of the first sub-blocks corresponds to a forbidden pattern, the reference sub-blocks indicating the second sub-blocks that correspond to a reference pattern and the third sub-blocks including a redundant information sub-block and non-redundant information sub-blocks, a rearranging unit to rearrange the first sub-blocks and the third sub-blocks to generate an output stream.

The encoding unit to encode the second sub-blocks may include a writing unit to write the number and location of the reference sub-blocks and an encoding state into the redundant information sub-block when the number of the reference sub-blocks corresponds to 1, in which the encoding state indicates that the second sub-blocks are encoded, and a storing unit to store non-reference sub-blocks into the non-redundant information sub-blocks, in which the non-reference sub-blocks indicates the second sub-blocks that do not correspond to the reference pattern.

The encoding unit to encode the second sub-blocks may further include the writing unit to write the number and location of the reference sub-blocks and the encoding state into the redundant information sub-block and some of the non-redundant information sub-blocks when the number of the reference sub-blocks is not less than 2 and not greater than a number of the third sub-blocks, and the writing unit to write the non-reference sub-blocks into others of the non-redundant information sub-blocks when the number of the reference sub-blocks is not less than 2 and not greater than the number of the third sub-blocks.

The encoding unit to encode the second sub-blocks may further include the writing unit to write the number of the reference sub-blocks and the encoding state into the redundant information sub-block when the number of the reference sub-blocks is equal to the number of the second sub-blocks, and a replacing unit to replace the non-redundant information sub-blocks into a predetermined pattern when the number of the reference sub-blocks is equal to the number of the second sub-blocks.

The encoding unit to encode the second sub-blocks may further include an inverting unit to invert the others of the non-redundant information sub-blocks according to a predetermined standard.

The inverting unit to invert the others of the non-redundant information sub-blocks may include the inverting unit to invert the non-redundant information sub-blocks when a total running digital sum (RDS) is greater than a positive value of a first threshold or a current RDS is greater than a positive value of a second threshold, the total RDS indicating an RDS of input streams received from a start time to a current time and the current RDS indicating an RDS of a current input stream, the inverting unit to invert the non-redundant information sub-blocks when the total RDS is less than a negative value of the first threshold or the current RDS is less than a negative value of the second threshold, and the writing unit to write an inversion state into the redundant information sub-block.

The encoding unit to encode the second sub-blocks may include the writing unit to write the second sub-blocks into the third sub-blocks when the number of the reference sub-blocks is equal to 0, and the writing unit to write a non-encoding state into the redundant information sub-block when the number of the reference sub-blocks is equal to 0, in which the non-encoding state indicates that the second sub-blocks are not encoded.

The data processing apparatus may further include the inverting unit to invert the second sub-blocks according to a predetermined standard to generate the third sub-blocks when all of the first sub-blocks do not correspond to the forbidden pattern.

The inverting unit to invert the second sub-blocks may include the inverting unit to invert the second sub-blocks to write the inverted second sub-blocks into the third sub-blocks when a total RDS is greater than a positive value of a first threshold or a current RDS is greater than a positive value of a second threshold, the total RDS indicating an RDS of input streams received from a start time to a current time and the current RDS indicating an RDS of a current input stream, the inverting unit to invert the second sub-blocks to write the inverted second sub-blocks into the third sub-blocks when the total RDS is less than a negative value of the first threshold or the current RDS is less than a negative value of the second threshold, and the writing unit to write an inversion state into the redundant information sub-block.

The forbidden pattern may have characteristics such that the DC component is greater than a predetermined threshold when one of the first and second sub-blocks is encoded.

The reference pattern may correspond to a pattern of bit combinations to control the DC component when the second sub-blocks are encoded.

The foregoing and/or other aspects and utilities of the general inventive concept may also be achieved by providing a data processing apparatus includes a partitioning unit to partition an encoded stream into first sub-blocks and third sub-blocks, the third sub-blocks including a redundant information sub-block and non-redundant information sub-blocks, a decoding unit to decode the third sub-blocks based on an encoding state in the redundant information sub-block to generate second sub-blocks when at least one of the first sub-blocks corresponds to a forbidden pattern, the encoding state indicating whether the second sub-blocks are encoded, and a rearranging unit to rearrange the first sub-blocks and the second sub-blocks to generate a decoded stream.

The decoding unit to decode the third sub-blocks may include a obtaining unit to obtain a the number of the reference sub-blocks in the redundant information sub-block when the encoding state indicates that the third sub-blocks are encoded, in which the reference sub-blocks indicates the third sub-blocks that correspond to a reference pattern.

The decoding unit to decode the third sub-blocks may further include a replacing unit to replace each of the third sub-blocks into the reference pattern when the number of the reference sub-blocks corresponds to a number of the third sub-blocks.

The decoding unit to decode the third sub-blocks may further include an obtaining unit to obtain an inversion state from the redundant information sub-block when the number of the reference sub-blocks is less than the number of the third sub-blocks, the replacing unit to replace some of the third sub-blocks into the reference pattern based on the number and location of the reference sub-blocks, the some of the third sub-blocks including the redundant information sub-block, and an inverting unit to invert others of the third sub-blocks based on the inversion state.

The data processing apparatus may further include a writing unit to write the second sub-blocks based on the third sub-blocks except for the encoding state when the encoding state indicates that the third sub-blocks are not encoded.

The data processing apparatus may further include an inverting unit to invert the third sub-blocks based on an inversion state to generate the second sub-blocks when all of the first sub-blocks do not correspond to the forbidden pattern.

The inverting unit to invert the third sub-blocks may include the inverting unit to invert the third sub-blocks except for the inversion state to generate the second sub-blocks when the inversion state indicates that the second sub-blocks are inverted, and a non-inverting unit to non-invert the third sub-blocks to generate the second sub-blocks when the inversion state indicates that the second sub-blocks are not inverted.

Therefore, exemplary embodiments of the present general inventive concept may properly control the DC component.

The foregoing and/or other aspects and utilities of the general inventive concept may also be achieved by providing an encoding method, including partitioning an input stream into a plurality of sets of sub-blocks and encoding one set of sub-blocks based on a number and a location of reference sub-blocks to generate an additional set of sub-blocks when at least one of an other set of sub-blocks corresponds to a forbidden pattern, wherein the additional set of sub-blocks include one or more redundant information sub-blocks and one or more non-redundant information sub-blocks.

The foregoing and/or other aspects and utilities of the general inventive concept may also be achieved by providing a data processing system, including an encoding apparatus including an encoding partitioning unit to partition an input stream into a plurality of sets of sub-blocks, an encoding unit to encode one set of sub-blocks based on a number and a location of reference sub-blocks to generate an additional set of sub-blocks having one or more redundant information sub-blocks and one or more non-redundant information sub-blocks when at least one of an other set of sub-blocks corresponds to a forbidden pattern and to generate an encoded stream, and a decoding apparatus including a decoding partitioning unit to partition the encoded stream into the additional set of sub-blocks and the other set of sun-blocks, the additional set of sub-blocks including the one or more redundant information sub-blocks and the one or more non-redundant information sub-blocks and a decoding unit to decode the additional set of sub-blocks based on an encoding state in the one or more redundant information sub-blocks to generate the one set of sub-blocks when at least one of the other set of sub-blocks corresponds to the forbidden pattern and to generate a decoded stream, wherein the encoding state is indicative of whether the one set of sub-blocks are encoded.

The foregoing and/or other aspects and utilities of the general inventive concept may also be achieved by providing a method of operating a data processing system, the method including partitioning an input stream into a plurality of sets of sub-blocks, encoding one set of sub-blocks based on a number and a location of reference sub-blocks to generate an additional set of sub-blocks having one or more redundant information sub-blocks and one or more non-redundant information sub-blocks when at least one of an other set of sub-blocks corresponds to a forbidden pattern, generating an encoded stream, partitioning the encoded stream into the additional set of sub-blocks having the one or more redundant information sub-blocks and the one or more non-redundant information sub-blocks and the other set of sun-blocks, decoding the additional set of sub-blocks based on an encoding state indicative of whether the one set of sub-blocks are encoded in the one or more redundant information sub-blocks to generate the one set of sub-blocks when at least one of the other set of sub-blocks corresponds to the forbidden pattern and generating a decoded stream.

The foregoing and/or other aspects and utilities of the general inventive concept may also be achieved by providing a computer-readable recording medium having embodied thereon a computer program to execute a method, wherein the method including partitioning an input stream into a plurality of sets of sub-blocks and encoding one set of sub-blocks based on a number and a location of reference sub-blocks to generate an additional set of sub-blocks having one or more redundant information sub-blocks and one or more non-redundant information sub-blocks when at least one of an other set of sub-blocks corresponds to a forbidden pattern.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 6 is a table diagram illustrating a forbidden pattern according to an embodiment of the present general inventive concept.

FIG. 7 is a mapping table illustrating a procedure of an encoder encoding the second sub-blocks according to an embodiment of the present general inventive concept.

DETAILED DESCRIPTION OF THE PREFERRED EMBODIMENTS

Figure 1:
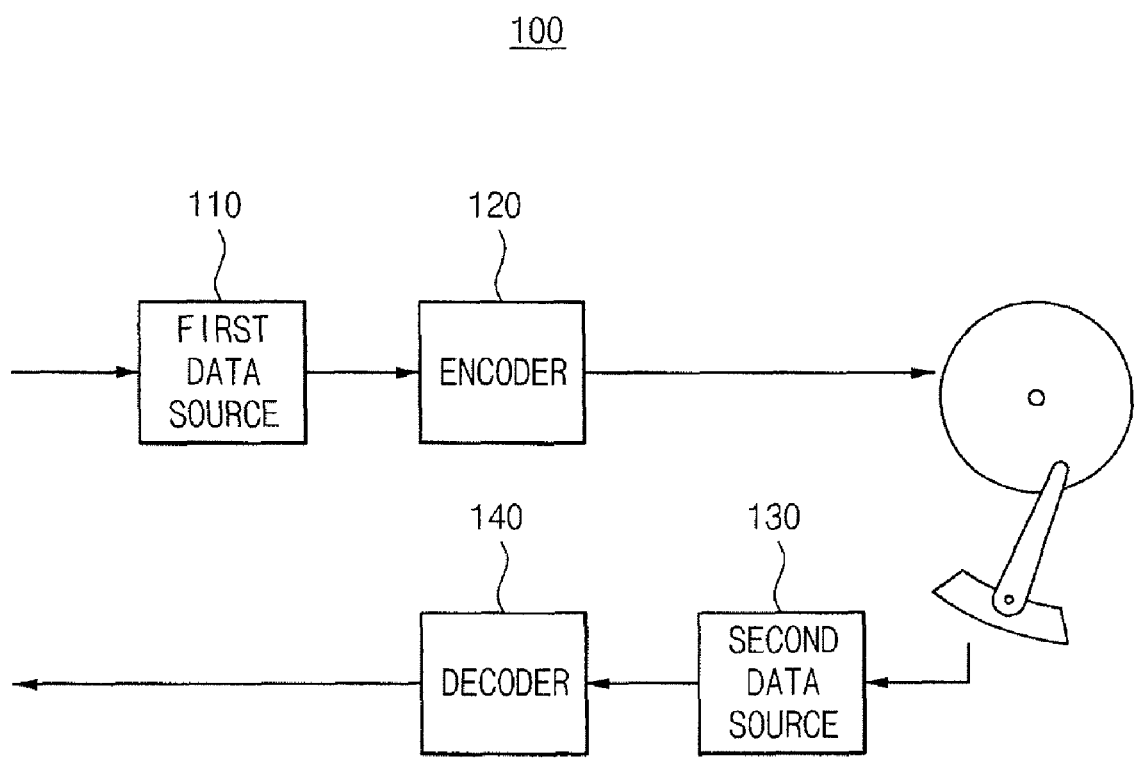
FIG. 1 is a block diagram illustrating a data processing apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present general inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the general inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, operations, elements, and/or components, but do not preclude the presence or addition of one or more other features, integers, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a data processing apparatus according to an exemplary embodiment of the present general inventive concept.

Referring to FIG. 1, the data processing apparatus 100 includes a first data source 110, an encoder 120, a second data source 130 and a decoder 140.

The first data source 110 receives an input stream from an external source such as a memory device (not illustrated). For example, the input stream may include a bit stream of digital data such as music and image files.

The encoder 120 encodes the input stream to generate an output stream. The operation of the encoder 120 will be described later.

The second data source 130 receives an encoded data stream from an external source such as storage media and the Internet. For example, the encoded data stream may correspond to an encoded digital data encoded by the encoder 120.

The decoder 140 decodes the encoded data stream to generate a decoded data stream. The operation of the decoder 140 will be described later.

Figure 2:
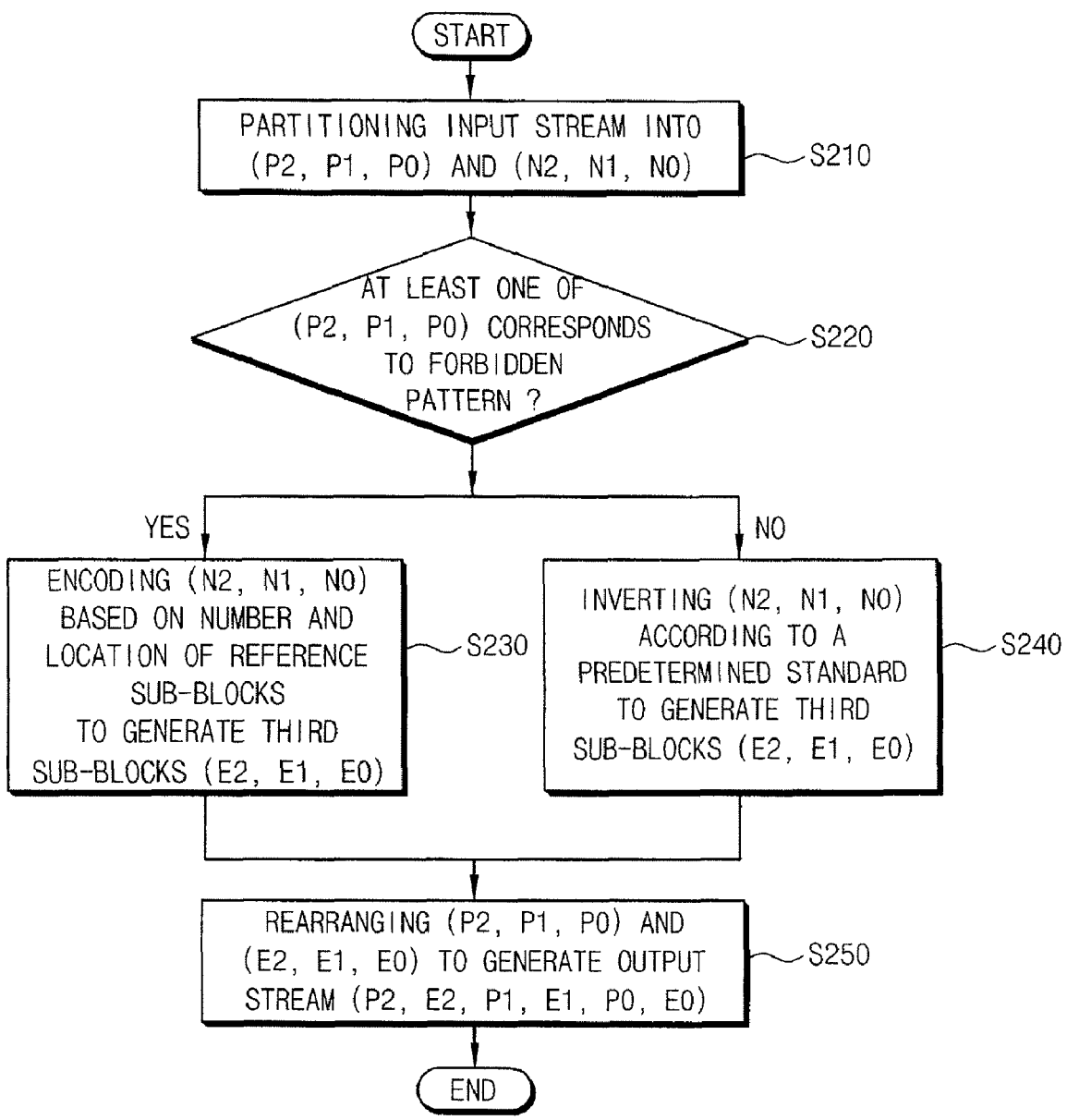
FIG. 2 is a flowchart illustrating a procedure of the encoder in FIG. 1 encoding an input stream.

FIG. 2 is a flowchart illustrating a procedure of the encoder 120 encoding the input stream.

In FIG. 2, it is assumed that a number of first sub-blocks included in a non-encoding block corresponds to 3 and a number of second sub-blocks included in an encoding block corresponds to 3. Also, it is assumed that each of the first and second sub-blocks corresponds to 4-bit data. The above assumptions are used to describe an exemplary embodiment of the present general inventive concept and do not limit a scope of the present general inventive concept.

The encoder 120 partitions the input stream into the first sub-blocks (P2, P1, P0) and the second sub-blocks (N2, N1, N0) (operation S210).

Figure 6:
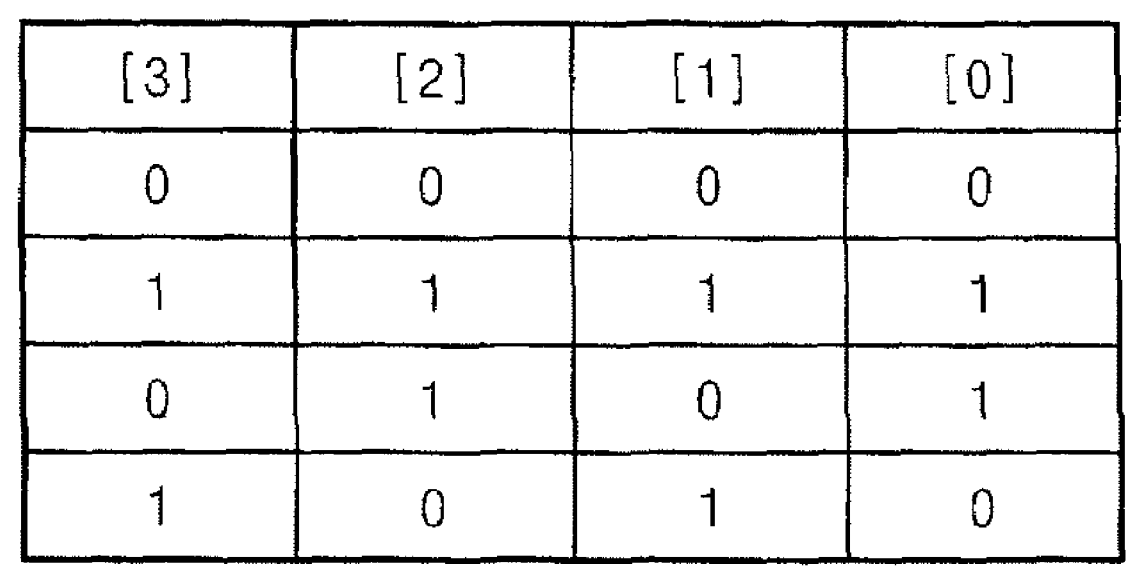

The encoder 120 determines whether at least one of the first sub-blocks (P2, P1, P0) corresponds to a forbidden pattern (operation S220). For example, the forbidden pattern may have characteristics such that a direct current (DC) component is greater than a predetermined threshold when one of the first and second sub-blocks (P2, P1, P0) and (N2, N1, N0) is encoded, and may include bit patterns such as '0000', '1111', '0101' and '1010', as illustrated in FIG. 6.

When at least one of the first sub-blocks (P2, P1, P0) corresponds to the forbidden pattern (operation S220: YES), the encoder 120 encodes the second sub-blocks (N2, N1, N0) based on a number and location of reference sub-blocks to generate third sub-blocks (E2, E1, E0) (operation S230).

The reference sub-blocks indicate the second sub-blocks that correspond to a reference pattern and the third sub-blocks includes a redundant information sub-block (E0) and non-redundant information sub-blocks (E2, E1). For example, the redundant information sub-block may have 1 bit more than the non-redundant information sub-block and the reference pattern may correspond to a pattern of bit combinations capable of properly controlling the DC component when the second sub-blocks (N2, N1, N0) are encoded. A more detailed description will be described with reference to FIGS. 4 and 5.

When all of the first sub-blocks do not correspond to the forbidden pattern (operation S220: NO), the encoder 120 inverts the second sub-blocks (N2, N1, N0) according to a predetermined standard to generate the third sub-blocks (E2, E1, E0) (operation S240). A more detailed description will be described with reference to FIG. 3.

The encoder 120 rearranges the first sub-blocks (P2, P1, P0) and the third sub-blocks (E2, E1, E0) to generate an output stream (e.g., P2, E2, P1, E1, P0, E0) (operation S250).

Figure 3:
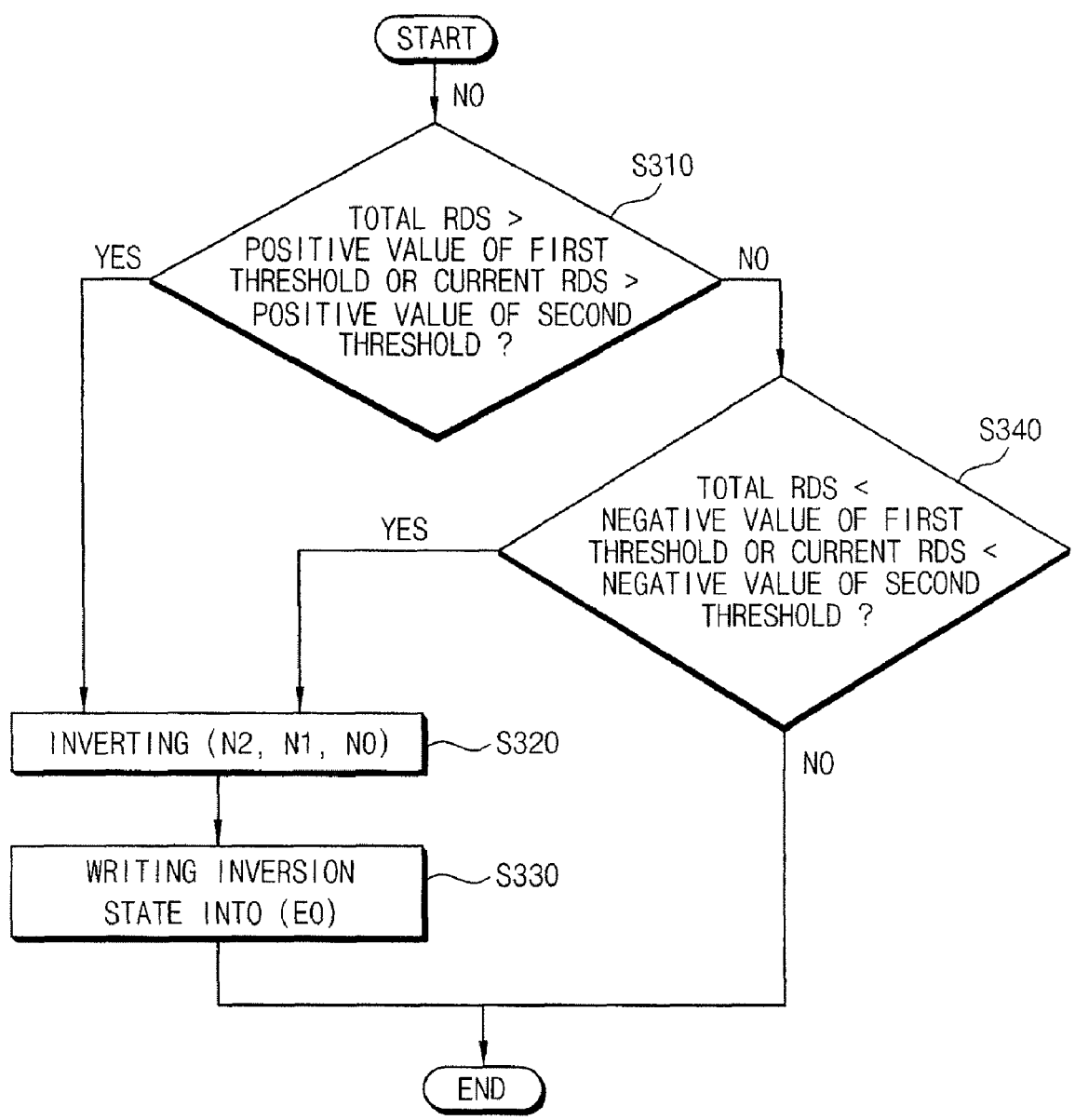
FIG. 3 is a flowchart illustrating a procedure of an encoder inverting second sub-blocks according to a predetermined standard to generate third sub-blocks.

FIG. 3 is a flowchart illustrating a procedure of the encoder inverting second sub-blocks (N2, N1, N0) according to a predetermined standard to generate third sub-blocks (E2, E1, E0) according to an embodiment of the present general inventive concept.

In FIG. 3, it is assumed that a number of first sub-blocks included in a non-encoding block corresponds to 3 and a number of second sub-blocks included in an encoding block corresponds to 3. Also, it is assumed that each of the first and second sub-blocks corresponds to 4-bit data. The above assumptions are used to describe an exemplary embodiment of the present general inventive concept and do not limit a scope of the present general inventive concept.

The encoder 120 determines whether a total RDS is greater than a positive value of a first threshold or a current RDS is greater than a positive value of a second threshold (operation S310).

The RDS is used to represent a number of a bit '0' and '1' in the digital data, and may allocate '+1' when the bit corresponds to '1' and '−1' when the bit corresponds to '0' to accumulate allocated values. The total RDS indicates an RDS of input streams received from a start time to a current time, and the current RDS indicates an RDS of a current input stream.

When the total RDS is greater than a positive value of a first threshold or the current RDS is greater than a positive value of a second threshold (operation S310: YES), the encoder 120 inverts the second sub-blocks (N2, N1, N0) to write the inverted second sub-blocks (N2, N1, N0) into the third sub-blocks (E2, E1, E0) (operation S320).

An encoder 120 writes an inversion state into a redundant information sub-block (E0) (operation S330).

When the total RDS is not greater than the positive value of the first threshold and the current RDS is not greater than the positive value of the second threshold (operation S310: NO), The encoder 120 determines whether the total RDS is less than a negative value of the first threshold or the current RDS is less than a negative value of the second threshold (operation S340).

When the total RDS is less than a negative value of the first threshold or the current RDS is less than a negative value of the second threshold (operation S340: YES), the encoder 120 inverts the second sub-blocks (N2, N1, N0) to write the inverted second sub-blocks (N2, N1, N0) into the third sub-blocks (E2, E1, E0) (operation S320).

The encoder 120 writes an inversion state into the redundant information sub-block (E0) (operation S330).

Figure 4:
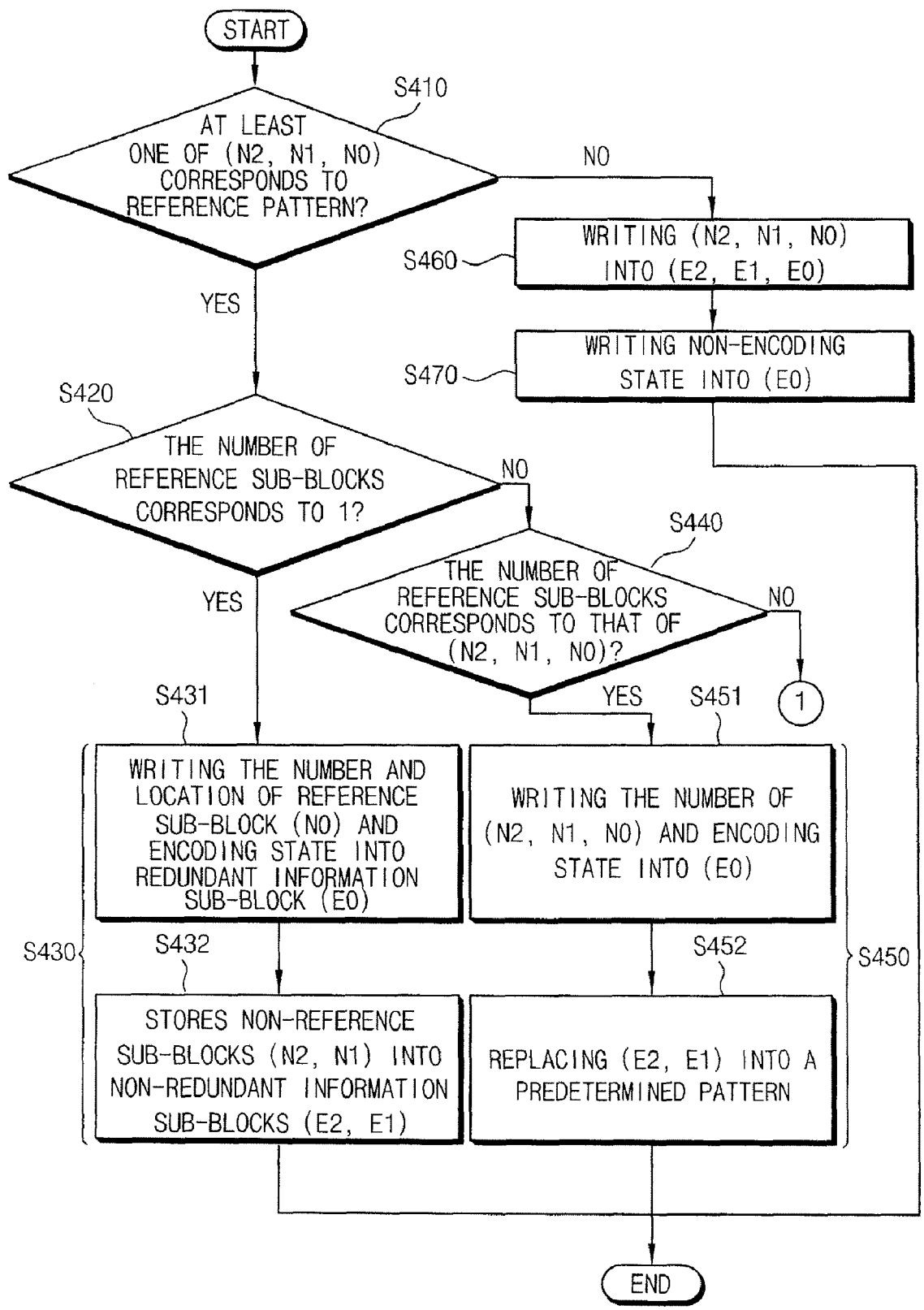
FIGS. 4 and 5 are a flowchart illustrating a procedure of an encoder encoding the second sub-blocks based on a number and location of reference sub-blocks to generate third sub-blocks according to an embodiment of the present general inventive concept.
Figure 5:
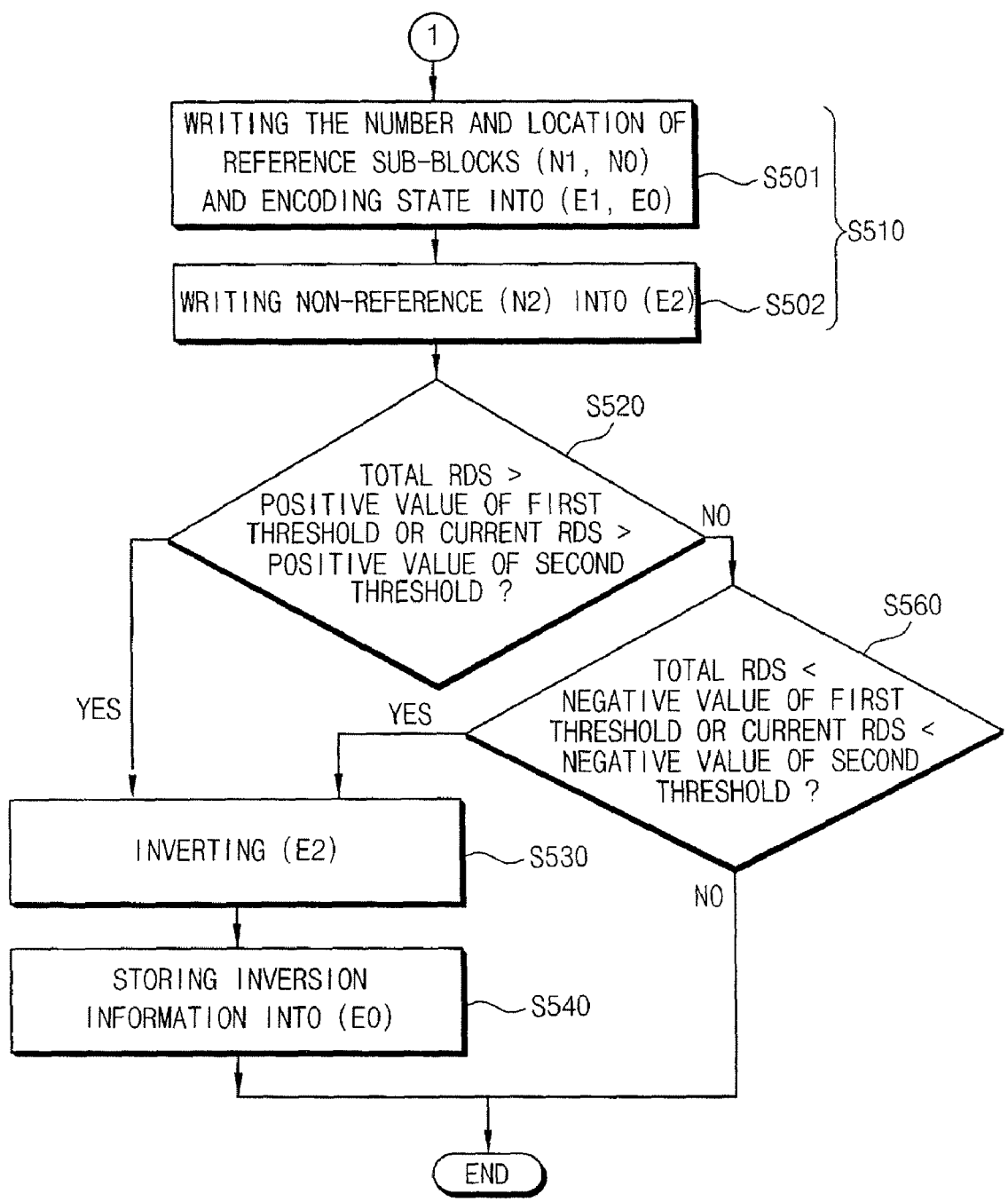

FIGS. 4 and 5 are flowcharts illustrating procedures of an encoder 120 encoding the second sub-blocks (N2, N1, N0) based on a number and location of reference sub-blocks to generate third sub-blocks (E2, E1, E0) according to an embodiment of the present general inventive concept.

The encoder 120 determines whether at least one of the second sub-blocks (N2, N1, N0) corresponds to a reference pattern (operation S410). That is, the encoder 120 determines whether a number of the reference sub-blocks is equal to or greater than 1.

When at least one of the second sub-blocks (N2, N1, N0) corresponds to a reference pattern (operation S410: YES), the encoder 120 determines whether the number of the reference sub-blocks corresponds to 1 (operation S420).

When the number of the reference sub-blocks corresponds to 1 (operation S420: YES), the encoder 120 writes the number and location of the reference sub-block (for example, NO) and an encoding state into the redundant information sub-block (E0) (operation S431). The encoding state indicates that the second sub-blocks (N2, N1, N0) are encoded. For example, the encoding state may be implemented as 1-bit data.

In addition, when the number of the reference sub-blocks corresponds to 1, the encoder 120 stores non-reference sub-blocks (for example, N2 and N1) into the non-redundant information sub-blocks (E2, E1) (operation S432). The non-reference sub-blocks indicate the second sub-blocks that do not correspond to the reference pattern.

When the number of the reference sub-blocks does not correspond to 1 (operation S420: NO), the encoder 120 determines whether the number of the reference sub-blocks is equal to the number of the second sub-blocks (N2, N1, N0) (operation S440).

When the number of the reference sub-blocks is equal to the number of the second sub-blocks (N2, N1, N0) (operation S440: YES), the encoder 120 writes the number of the reference sub-blocks and the encoding state into the redundant information sub-block (E0) (operation S451).

In addition, when the number of the reference sub-blocks is equal to the number of the second sub-blocks (N2, N1, N0), the encoder 120 replaces the non-redundant information sub-blocks (E2, E1) into a predetermined pattern (operation S452).

When the number of the reference sub-blocks is not equal to the number of the second sub-blocks (N2, N1, N0) (operation S440: NO), that is, when the number of the reference sub-blocks is equal to 2 since it is assumed that the number of the second sub-blocks corresponds to 3, the encoder 120 writes the number and location of the reference sub-blocks (for example, N0 and N1) and the encoding state into the redundant information sub-block (E0) and some of the non-redundant information sub-blocks (E1) (operation S501).

In addition, when the number of the reference sub-blocks is equal to 2, the encoder 120 writes the non-reference sub-blocks into others of the non-redundant information sub-blocks (E2) (operation S502).

When the number of the reference sub-blocks is equal to 2, the encoder 120 may invert the others of the non-redundant information sub-blocks (E2) according to a predetermined standard.

The encoder 120 may determine whether the total RDS is greater than a positive value of a first threshold or the current RDS is greater than a positive value of a second threshold (operation S520).

When the total RDS is greater than a positive value of a first threshold or the current RDS is greater than a positive value of a second threshold (operation S520: YES), the encoder 120 may invert the non-redundant information sub-blocks (E2) (operation S530), and may write an inversion state into the redundant information sub-block (E0) (operation S540). For example, the inversion state may be represented as 1-bit data and may be alternatively used to indicate the encoding state.

When the total RDS is not greater than the positive value of the first threshold and the current RDS is not greater than the positive value of the second threshold (operation S520: NO, the encoder 120 may determine whether the total RDS is less than a negative value of the first threshold or the current RDS is less than a negative value of the second threshold (operation S560).

When the total RDS is less than a negative value of the first threshold or the current RDS is less than a negative value of the second threshold (operation S560: YES), the encoder 120 may invert the non-redundant information sub-blocks (E2) (operation S530), and may write an inversion state into the redundant information sub-block (E0) (operation S540).

When all of the second sub-blocks (N2, N1, N0) do not correspond to the reference pattern (operation S410: NO), the encoder 120 writes the second sub-blocks (N2, N1, N0) into the third sub-blocks (E2, E1, E0) (operation S460) and writes a non-encoding state into the redundant information sub-block (E0) (operation S470). The non-encoding state indicates that the second sub-blocks (N2, N1, N0) are not encoded and may be represented as 1-bit data.

FIG. 7 is a mapping table illustrating a procedure of an encoder encoding the second sub-blocks (N2, N1, N0) according to an embodiment of the present general inventive concept.

In FIG. 7, it is assumed that a number of first sub-blocks included in a non-encoding block corresponds to 3 and a number of second sub-blocks included in an encoding block corresponds to 3. Also, it is assumed that each of the first and second sub-blocks corresponds to 4-bit data. Furthermore, it is assumed that total RDS corresponds to 3, and the first and second thresholds correspond to 7.

The above assumptions are used to describe an exemplary embodiment of the present general inventive concept and do not limit a scope of the present general inventive concept.

(1) Hereinafter, the operation of the encoder 120 will be described when all of the first sub-blocks (P2, P1, P0) do not correspond to a forbidden pattern.

First, it is assumed that the first sub-blocks (P2, P1, P0) correspond to (1001, 1001, 1001) and the second sub-blocks (N2, N1, N0) correspond to (1001, 1001, 1001).

Because all of the first sub-blocks (P2, P1, P0) do not correspond to the forbidden pattern (operation S220: NO), the encoder 120 inverts the second sub-blocks (N2, N1, N0) according to a predetermined standard to generate the third sub-blocks (E2, E1, E0) (operation S240).

The encoder 120 calculates the total RDS and current RDS. The total RDS corresponds to 3 and the current RDS corresponds to 0.

The encoder 120 determines that the total RDS is not greater than the positive value of a first threshold and the current RDS is not greater than the positive value of a second threshold (operation S310: NO). Also, the encoder 120 determines that the total RDS is not less than a negative value of the first threshold and the current RDS is not less than a negative value of the second threshold (operation S340: NO).

Thus, the encoder 120 encodes the third sub-blocks (E2, E1, E0) as (1001, 1001, 10001), as illustrated in a $1^{st}$ row in FIG. 7.

Second, it is assumed that the first sub-blocks (P2, P1, P0) correspond to (1110, 1110, 1110) and the second sub-blocks (N2, N1, N0) correspond to (1110, 1110, 1110).

Because all of the first sub-blocks (P2, P1, P0) do not correspond to the forbidden pattern (operation S220: NO), the encoder 120 inverts the second sub-blocks (N2, N1, N0) according to a predetermined standard to generate the third sub-blocks (E2, E1, E0) (operation S240).

The encoder 120 calculates the total RDS and the current RDS. The total RDS corresponds to 14 and the current RDS corresponds to 11.

The encoder 120 determines that the total RDS is greater than the positive value of the first threshold or the current RDS is greater than the positive value of the second threshold (operation S310: YES).

The encoder 120 inverts the second sub-blocks (N2, N1, N0) to write the inverted second sub-blocks (N2, N1, N0) into the third sub-blocks (E2, E1, E0) (operation S320). Thus, the encoder 120 encodes the third sub-blocks (E2, E1, E0) as (0001, 0001, 00001), as illustrated in a $1^{st}$ row in FIG. 7.

The encoder 120 writes the inversion state into the redundant information sub-block (E0) (operation S330). Thus, the encoder 120 encodes the third sub-blocks (E2, E1, E0) as (0001, 0001, 00101), as illustrated in a $1^{st}$ row in FIG. 7.

Third, it is assumed that the first sub-blocks (P2, P1, P0) correspond to (0001, 0001, 0001) and the second sub-blocks (N2, N1, N0) correspond to (0001, 0001, 0001).

Because all of the first sub-blocks (P2, P1, P0) do not correspond to the forbidden pattern (operation S220: NO), the encoder 120 inverts the second sub-blocks (N2, N1, N0) according to a predetermined standard to generate the third sub-blocks (E2, E1, E0) (operation S240).

The encoder 120 calculates the total RDS and the current RDS. The total RDS corresponds to −10 and the current RDS corresponds to −13.

The encoder 120 determines that the total RDS is less than a negative value of the first threshold or the current RDS is less than a negative value of the second threshold (operation S340: YES).

The encoder 120 inverts the second sub-blocks (N2, N1, N0) to write the inverted second sub-blocks (N2, N1, N0) into the third sub-blocks (E2, E1, E0) (operation S320). Thus, the encoder 120 encodes the third sub-blocks (E2, E1, E0) as (1110, 1110, 11001), as illustrated in a $1^{st}$ row in FIG. 7.

The encoder 120 writes the inversion state into the redundant information sub-block (E0) (operation S330). Thus, the encoder 120 encodes the third sub-blocks (E2, E1, E0) as (1110, 1110, 11101), as illustrated in a $1^{st}$ row in FIG. 7.

(2) Hereinafter, the operation of the encoder 120 will be described when at least one of the first sub-blocks (P2, P1, P0) corresponds to the forbidden pattern.

First, it is assumed that the first sub-blocks (P2, P1, P0) correspond to (1111, 1001, 1001) and the second sub-blocks (N2, N1, N0) correspond to (1101, 1101, 1101).

Because one of the first sub-blocks (P2) corresponds to the forbidden pattern (operation S220: YES), the encoder 120 encodes the second sub-blocks (N2, N1, N0) based on the number and location of reference sub-blocks to generate third sub-blocks (E2, E1, E0) (operation S230).

The encoder 120 determines that all of the second sub-blocks (N2, N1, N0) do not correspond to a reference pattern (operation S410: NO).

The encoder 120 writes the second sub-blocks (N2, N1, N0) into the third sub-blocks (E2, E1, E0) (operation S460) and writes a non-encoding state into the redundant information sub-block (E0) (operation S470).

Thus, the encoder 120 encodes the third sub-blocks (E2, E1, E0) as (1101, 1101, 11001) (operation S460, S470), as illustrated in a $2^{nd}$ row in FIG. 7.

Second, it is assumed that the first sub-blocks (P2, P1, P0) correspond to (1111, 1001, 1001) and the second sub-blocks (N2, N1, N0) correspond to (1001, 1101, 1101).

Because one of the first sub-blocks (P2) corresponds to the forbidden pattern (operation S220: YES), the encoder 120 encodes the second sub-blocks (N2, N1, N0) based on the number and location of reference sub-blocks to generate third sub-blocks (E2, E1, E0) (operation S230).

The encoder 120 determines that at least one of the second sub-blocks (N2, N1, N0) corresponds to a reference pattern (operation S410: YES).

In addition, the encoder 120 determines that the number of the reference sub-blocks corresponds to 1 (operation S420: YES). That is, the sub-block (N2) corresponds to the reference pattern.

The encoder 120 writes the number and location of the reference sub-block (N0) and an encoding state into the redundant information sub-block (E0) (operation S431). Thus, the encoder 120 encodes the redundant information sub-block (E0) as (00111), as illustrated in a $6^{th}$ row of FIG. 7. That the most significant bit (MSB) of the redundant information sub-block (E0) corresponds to 0 and the least significant bit (LSB) of the redundant information sub-block (E0) corresponds to 1, that is, the number of the reference sub-blocks corresponds to 1.

The encoder 120 stores non-reference sub-blocks (N2, N1) into the non-redundant information sub-blocks (E2, E1) (operation S432). Thus, the encoder 120 encodes the third sub-blocks (E2, E1, E0) as (1101, 1101, 00111).

Third, it is assumed that the first sub-blocks (P2, P1, P0) correspond to (1111, 1001, 1001) and the second sub-blocks (N2, N1, N0) correspond to (1001, 1001, 1101).

Because one of the first sub-blocks (P2) corresponds to the forbidden pattern (operation S220: YES), the encoder 120 encodes the second sub-blocks (N2, N1, N0) based on the number and location of reference sub-blocks to generate third sub-blocks (E2, E1, E0) (operation S230).

The encoder 120 determines that at least one of the second sub-blocks (N2, N1, N0) corresponds to a reference pattern (operation S410: YES).

The encoder 120 determines that the number of the reference sub-blocks does not correspond to 1 (operation S420: NO). Also, the encoder 120 determines that the number of the reference sub-blocks does not correspond to the number of the second sub-blocks (N2, N1, N0) (operation S440: NO). That is, the encoder 120 determines that the number of the reference sub-blocks corresponds to 2.

The encoder 120 writes the number and location of the reference sub-blocks and the encoding state into the redundant information sub-block (E0) and some of the non-redundant information sub-blocks (E1) (operation S501).

Thus, the encoder 120 encodes the redundant information sub-block (E0) as (10100), as illustrated in an $8^{th}$ row of FIG. 7. That the MSB of the redundant information sub-block (E0) corresponds to 1 and the least significant bit (LSB) of the redundant information sub-block (E0) corresponds to 0, that is, the number of the reference sub-blocks corresponds to 2.

Also, the encoder 120 encodes the some of the non-redundant information sub-blocks (E1) as (0110), as illustrated in an $8^{th}$ row of FIG. 7. Two bits '11' in the middle of the some of the non-redundant information sub-block (E1) represent the location of the reference sub-blocks. That is, the two bits '11' indicate that sub-blocks (N2, N1) correspond to the reference pattern.

The encoder 120 writes the non-reference sub-blocks into others of the non-redundant information sub-blocks (E2) (operation S502). Thus, the encoder 120 encodes the third sub-blocks (E2, E1, E0) as (1101, 0110, 10100).

The encoder 120 may calculate the total RDS and the current RDS. The total RDS corresponds to 8 and the current RDS corresponds to 5. The total RDS is equal to an assumed initial value '3'+the RDS of the first sub-blocks (P2, P1, P0) '4'+the RDS of the third sub-blocks (E2, E1, E0) '1'.

The encoder 120 determines that the total RDS is greater than a positive value of a first threshold (operation S520: YES).

The encoder 120 inverts the non-redundant information sub-blocks (E2) (operation S530), and writes the inversion state into the redundant information sub-block (E0) (operation S530). Thus, the encoder 120 encodes the non-redundant information sub-blocks (E2) as (0010) and encodes the redundant information sub-block (E0) as (11100).

Thus, the encoder 120 encodes the third sub-blocks (E2, E1, E0) as (0010, 0110, 11100).

Fourth, that the first sub-blocks (P2, P1, P0) correspond to (1111, 1001, 1001) and the second sub-blocks (N2, N1, N0) correspond to (1001, 1001, 1001) is assumed.

Because one of the first sub-blocks (P2) corresponds to the forbidden pattern (operation S220: YES), the encoder 120 encodes the second sub-blocks (N2, N1, N0) based on the number and location of reference sub-blocks to generate third sub-blocks (E2, E1, E0) (operation S230).

The encoder 120 determines that at least one of the second sub-blocks (N2, N1, N0) corresponds to a reference pattern (operation S410: YES).

The encoder 120 determines that the number of the reference sub-blocks does not correspond to 1 (operation S420: NO), and determines that the number of the reference sub-blocks corresponds to the number of the second sub-blocks (N2, N1, N0) (operation S440: NO).

The encoder 120 writes the number of the reference sub-blocks and the encoding state into the redundant information sub-block (E0) (operation S451). Thus, the encoder 120 encodes the redundant information sub-block (E0) as (11101), as illustrated in a $9^{th}$ row of FIG. 7. That the MSB of the redundant information sub-block (E0) corresponds to 1 and the LSB of the redundant information sub-block (E0) corresponds to 1, that is, the number of the reference sub-blocks corresponds to 3.

The encoder 120 replaces the non-redundant information sub-blocks (E2, E1) into a predetermined pattern (operation S452). Thus, the encoder 120 encodes the non-redundant information sub-blocks (E2, E1) as (0110, 0110).

Thus, the encoder 120 encodes the third sub-blocks (E2, E1, E0) as (0110, 0110, 11101).

As described above, the encoder 120 may generate a RLL code having a 24/25 rate. That is, the encoder 120 uses 1-bit data to properly control the DC component.

Figure 8:
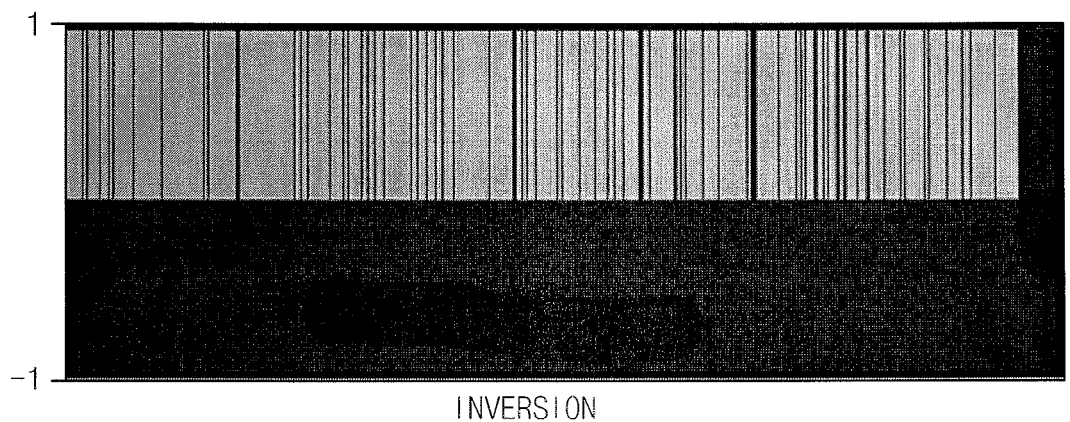
FIGS. 8, 11 and 14 are graphs illustrating inversion states of the second sub-blocks according to an embodiment of the present general inventive concept.
Figure 9:
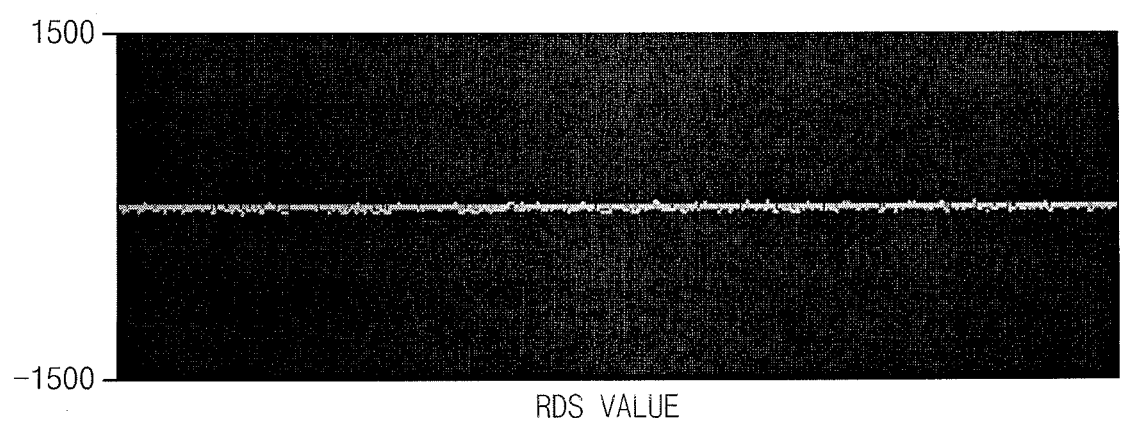
FIGS. 9, 12 and 15 are graphs illustrating simulation results of an encoder according to a probability that a bit in an input stream corresponds to '0' or '1' according to an embodiment of the present general inventive concept.
Figure 10:
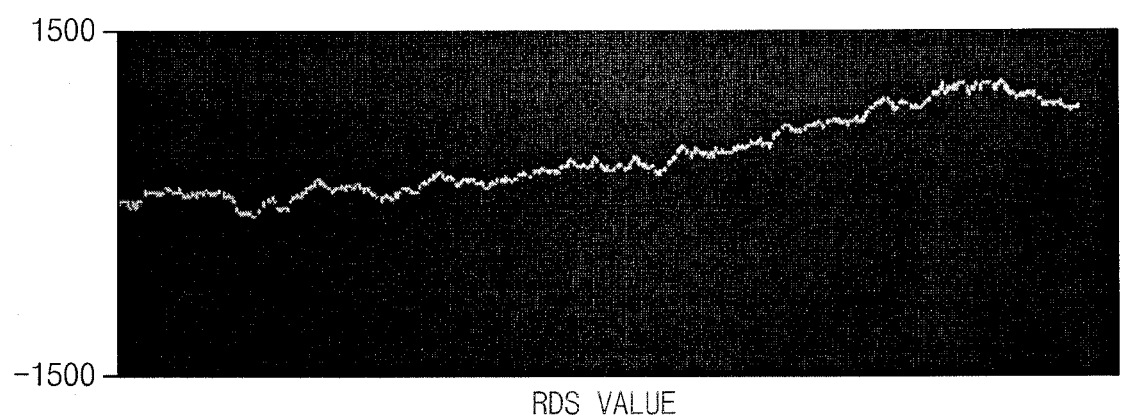
FIGS. 10, 13 and 16 are graphs illustrating simulation results of the conventional encoder according to a probability that a bit in the input stream corresponds to '0' or '1'.
Figure 11:
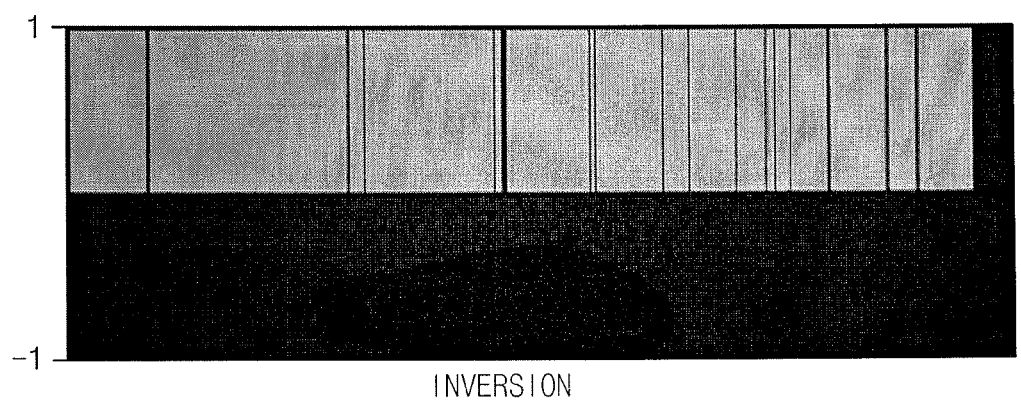
Figure 12:
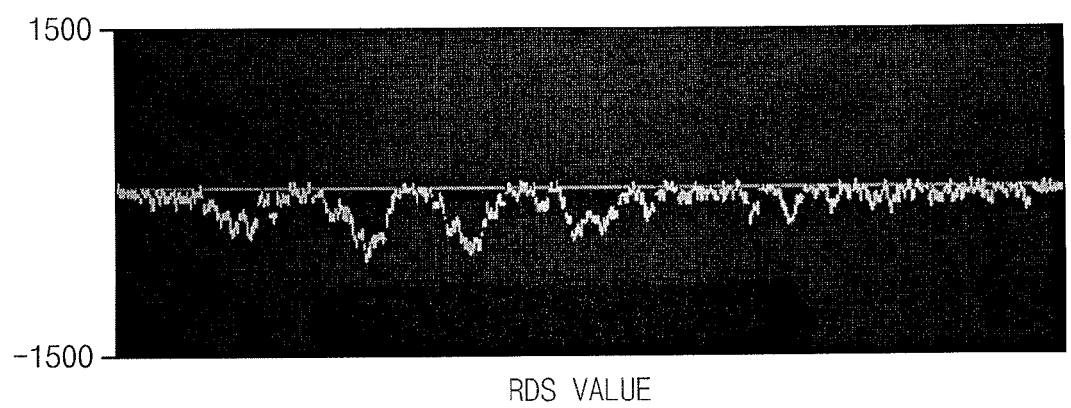
Figure 13:
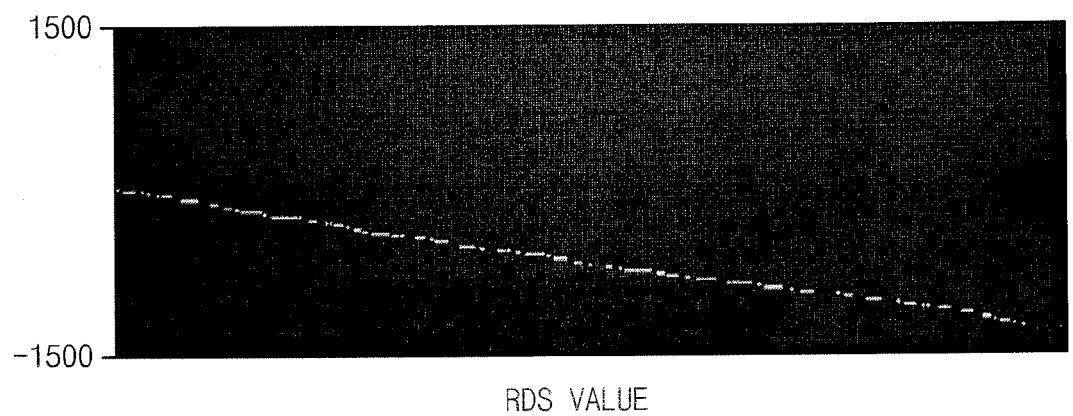
Figure 14:
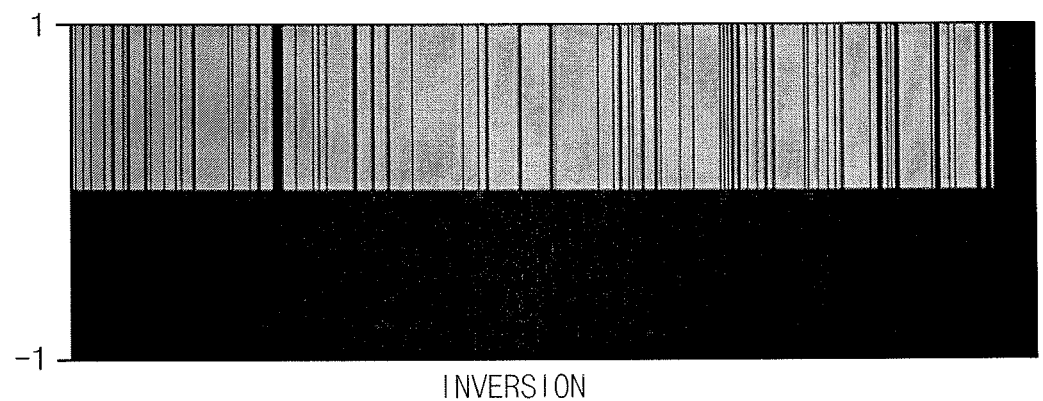
Figure 15:
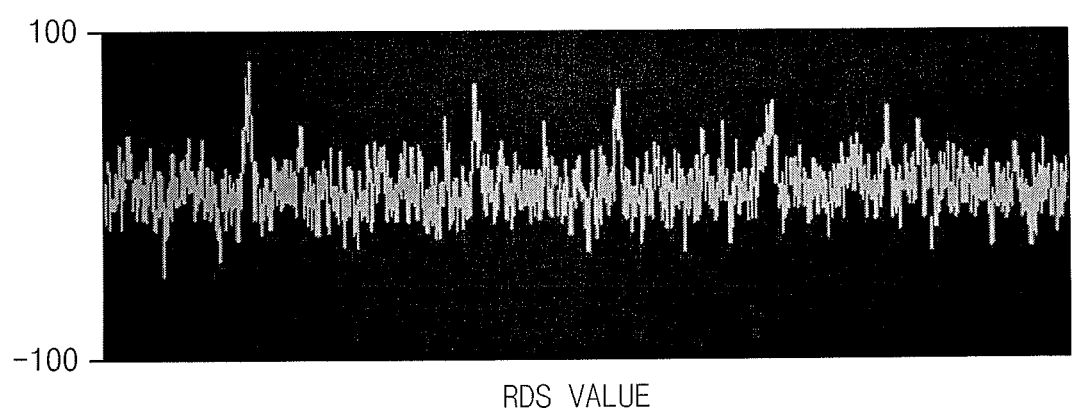
Figure 16:
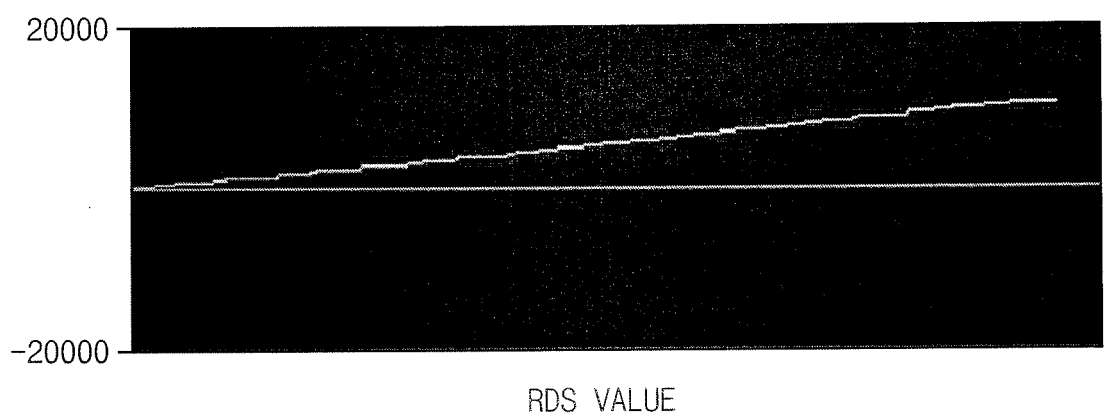

FIGS. 8, 11 and 14 are graphs illustrating the inversion states of the second sub-blocks (N2, N1, N0) according to an embodiment of the present general inventive concept. FIGS. 9, 12 and 15 are graphs illustrating simulation results of the encoder 120 in FIG. 1 according to a probability that a bit in the input stream corresponds to '0' or '1' according to an embodiment of the present general inventive concept, and FIGS. 10, 13 and 16 are graphs illustrating simulation results of the conventional encoder according to a probability that a bit in the input stream corresponds to '0' or '1'.

FIGS. 8, 9 and 10 assume that the probability that the bit in the input stream corresponds to '1' is 50%. FIGS. 11, 12 and 13 assume that the probability that the bit in the input stream is equal to '1' is 48% and FIGS. 14, 15 and 16 assume that the probability that the bit in the input stream is equal to '1' is 52%.

FIGS. 8 through 16 illustrate that the conventional encoder may not properly control the DC component but the encoder 120 may properly control the DC component. Also, the encoder 120 may adjust the first and second thresholds to improve performance.

Figure 17:
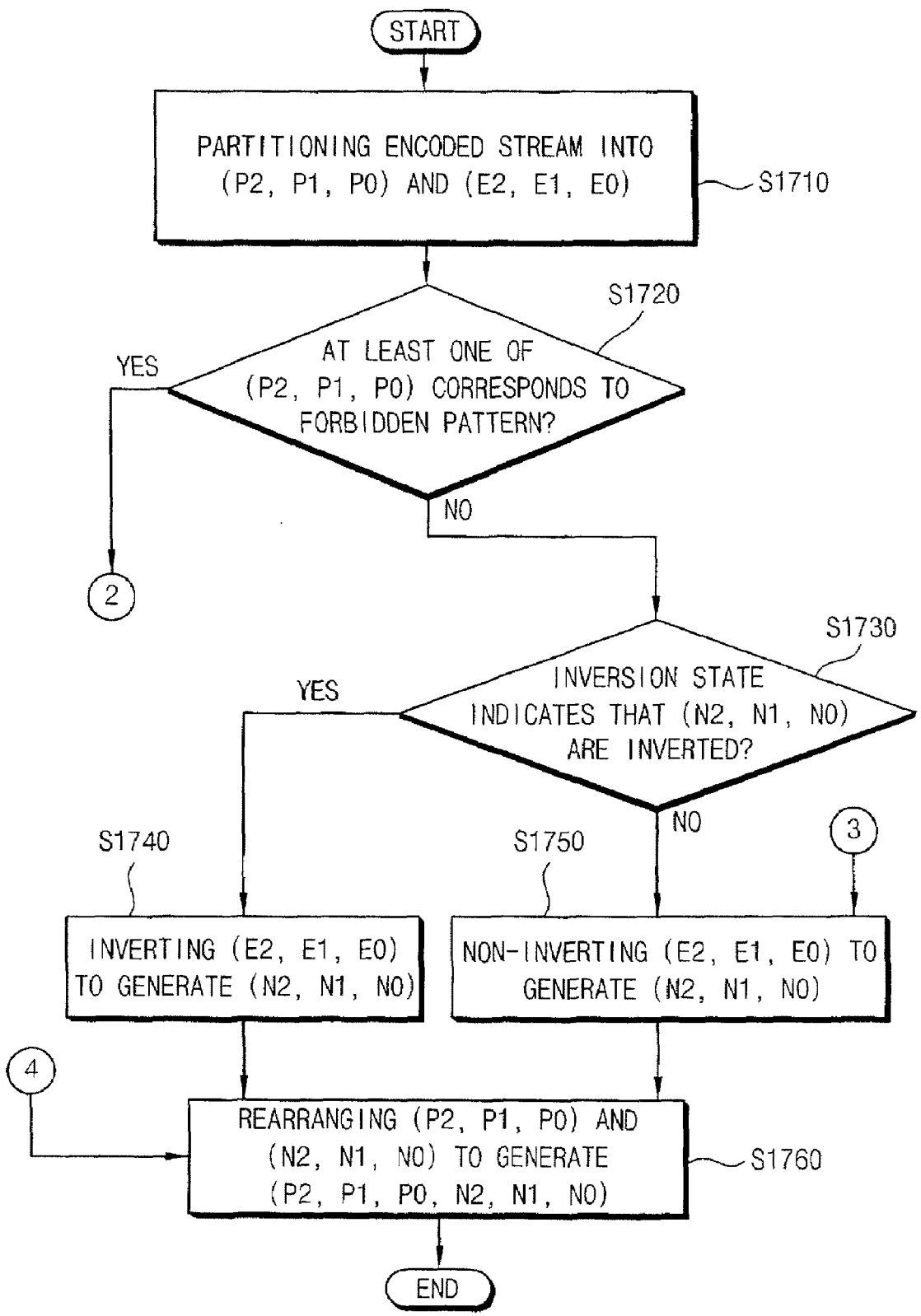
FIGS. 17 and 18 are a flowchart illustrating a procedure of a decoder decoding third sub-blocks to generate second sub-blocks according to an embodiment of the present general inventive concept.
Figure 18:
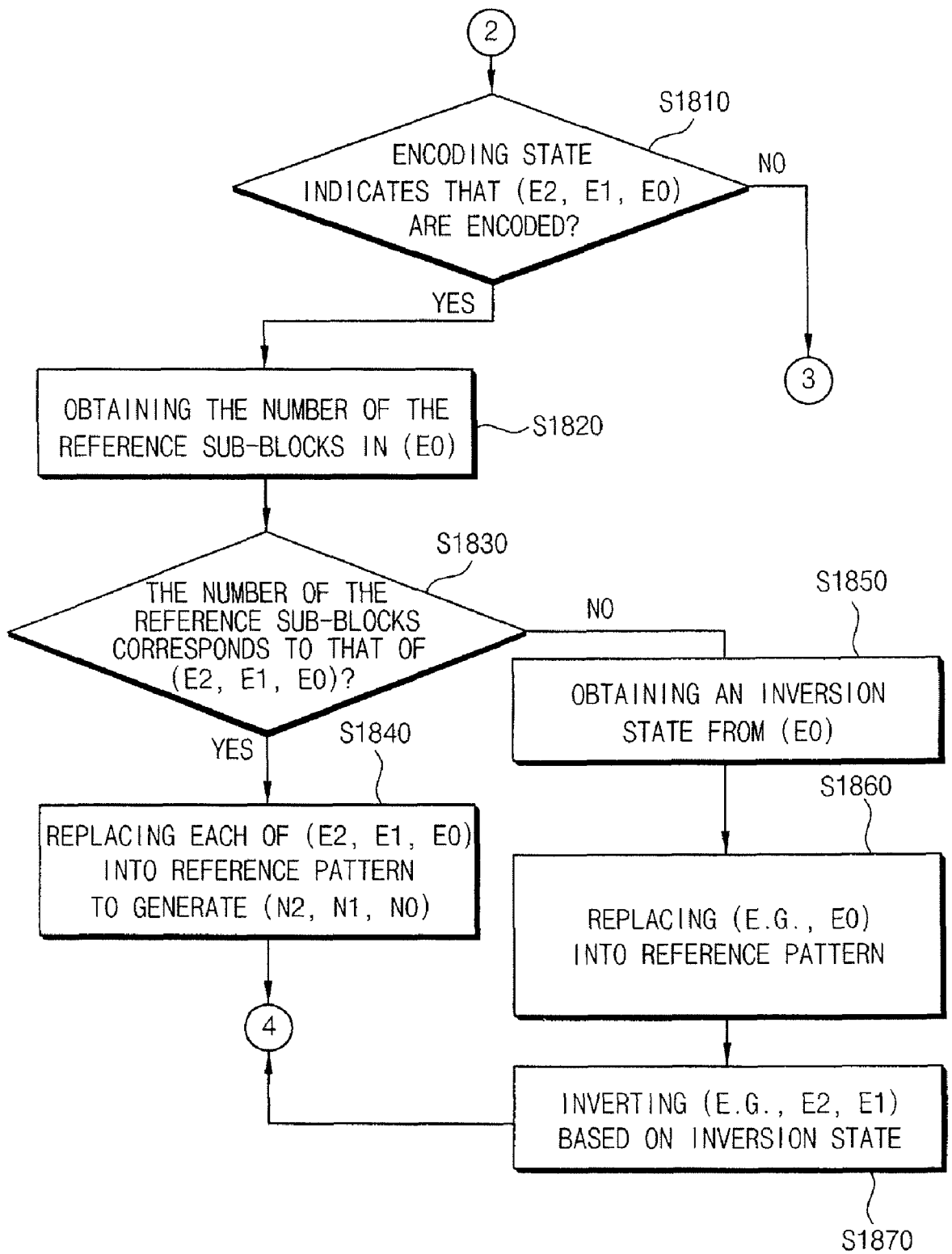

FIGS. 17 and 18 are flowcharts illustrating procedures of a decoder decoding third sub-blocks (E2, E1, E0) to generate second sub-blocks (N2, N1, N0).

In FIGS. 17 and 18, the decoding procedure may have a reverse order of the encoding procedure. Thus, the description obvious to one of ordinary skill in the art to which this general inventive concept belongs may be omitted.

The decoder 140 partitions an encoded stream into first sub-blocks (P2, P1, P0) and third sub-blocks (E2, E1, E0) (operation S1710). The third sub-blocks include a redundant information sub-block (E0) and non-redundant information sub-blocks (E2, E1).

The decoder 140 determines whether at least one of the first sub-blocks (P2, P1, P0) corresponds to a forbidden pattern (operation S1720).

When the at least one of the first sub-blocks (P2, P1, P0) corresponds to the forbidden pattern (operation S1720: YES), the decoder 140 determines whether an encoding state in the redundant information sub-block (E0) indicates that the second sub-blocks (N2, N1, N0) are encoded (operation S1810).

When the encoding state indicates that the second sub-blocks (N2, N1, N0) are encoded (operation S1810: YES), the decoder 140 obtains the number of the reference sub-blocks in the redundant information sub-block (E0) (operation S1820). The reference sub-blocks indicate the second sub-blocks that correspond to a reference pattern.

The decoder 140 determines whether the number of the reference sub-blocks corresponds to the number of the third sub-blocks (E2, E1, E0) (operation S1830).

When the number of the reference sub-blocks corresponds to the number of the third sub-blocks (E2, E1, E0) (operation S1830: YES), the decoder 140 replaces each of the third sub-blocks (E2, E1, E0) into the reference pattern (operation S1840).

The decoder 140 rearranges the first sub-blocks (P2, P1, P0) and the second sub-blocks (N2, N1, N0) to generate a decoded stream (e.g., P2, N2, P1, N1, P0, N0) (operation S1760).

When the number of the reference sub-blocks is less than the number of the third sub-blocks (E2, E1, E0) (operation S1830: NO), the decoder 140 obtains an inversion state from the redundant information sub-block (E0) (operation S1850), replaces some of the third sub-blocks (e.g., E1 and E0) into the reference pattern based on the number and location of the reference sub-blocks (operation S1860), and inverts others of the third sub-blocks (e.g., E2) based on the inversion state (operation S1870), to generate the second sub-blocks (N2, N1, N0). The some of the third sub-blocks includes the redundant information sub-block (E0).

The decoder 140 rearranges the first sub-blocks (P2, P1, P0) and the second sub-blocks (N2, N1, N0) to generate a decoded stream (e.g., P2, N2, P1, N1, P0, N0) (operation S1760).

That is, when the at least one of the first sub-blocks (P2, P1, P0) corresponds to the forbidden pattern, the decoder 140 decodes the third sub-blocks (E2, E1, E0) based on an encoding state in the redundant information sub-block (E0) to generate second sub-blocks (N2, N1, N0).

When the encoding state indicates that the second sub-blocks (N2, N1, N0) are not encoded (operation S1810: NO), the decoder 140 writes the second sub-blocks (N2, N1, N0) based on the third sub-blocks except for the encoding state (operation S1750).

The decoder 140 rearranges the first sub-blocks (P2, P1, P0) and the second sub-blocks (N2, N1, N0) to generate a decoded stream (e.g., P2, N2, P1, N1, P0, N0) (operation S1760).

When all of the first sub-blocks (P2, P1, P0) do not correspond to the forbidden pattern (operation S1750: NO), the decoder 140 inverts the third sub-blocks (E2, E1, E0) based on an inversion state to generate the second sub-blocks (N2, N1, N0).

That is, the decoder 140 inverts the third sub-blocks except for the inversion state to generate the second sub-blocks (N2, N1, N0) (operation S1740) when the inversion state indicates that the second sub-blocks (N2, N1, N0) are inverted (operation S1730: YES), and non-inverts the third sub-blocks (E2, E1, E0) to generate the second sub-blocks (N2, N1, N0) (operation S1750) when the inversion state indicates that the second sub-blocks are not inverted (operation S1730: NO).

The decoder 140 rearranges the first sub-blocks (P2, P1, P0) and the second sub-blocks (N2, N1, N0) to generate a decoded stream (e.g., P2, N2, P1, N1, P0, N0) (operation S1760).

Operations of an encoder and a decoder are described alone, but it will be understood to those of ordinary skill in the art that data processing apparatuses including the encoder and the decoder may also be implemented.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, various embodiments of the present general inventive concept may properly control a DC component.

While the various embodiments of the present general inventive concept and their advantages have been described in detail, it should be understood that various changes, substitutions and alterations may be made herein without departing from the scope of the general inventive concept.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An encoding method to control a direct current (DC) component in a data processing apparatus, comprising:
    partitioning an input stream into first sub-blocks and second sub-blocks using an encoding apparatus;
    encoding the second sub-blocks based on a number and location of reference sub-blocks to generate third sub-blocks when at least one of the first sub-blocks corresponds to a forbidden pattern, the reference sub-blocks indicating the second sub-blocks that correspond to a reference pattern and the third sub-blocks including a redundant information sub-block and non-redundant information sub-blocks using the encoding apparatus; and
    rearranging the first sub-blocks and the third sub-blocks to generate an output stream,
    wherein when the number of the reference sub-blocks is equal to 0, encoding the second sub-blocks comprises:
        writing the second sub-blocks into the third sub-blocks; and
        writing a non-encoding state into the redundant information sub-block, the non-encoding state indicating that the second sub-blocks are not encoded.

2. The method of claim 1, wherein encoding the second sub-blocks comprises:
    writing the number and location of the reference sub-blocks and an encoding state into the redundant information sub-block when the number of the reference sub-blocks corresponds to 1, the encoding state indicating that the second sub-blocks are encoded; and
    storing non-reference sub-blocks into the non-redundant information sub-blocks when the number of the reference sub-blocks corresponds to 1, the non-reference sub-blocks indicating the second sub-blocks that do not correspond to the reference pattern.

3. The method of claim 2, wherein encoding the second sub-blocks further comprises:
    writing the number and location of the reference sub-blocks and the encoding state into the redundant information sub-block and some of the non-redundant information sub-blocks when the number of the reference sub-blocks is not less than 2 and not greater than a number of the second sub-blocks; and
    writing the non-reference sub-blocks into others of the non-redundant information sub-blocks when the number of the reference sub-blocks is not less than 2 and not greater than the number of the second sub-blocks.

4. The method of claim 3, wherein encoding the second sub-blocks further comprises:
    writing the number of the reference sub-blocks and the encoding state into the redundant information sub-block when the number of the reference sub-blocks is equal to the number of the second sub-blocks; and
    replacing the non-redundant information sub-blocks into a predetermined pattern when the number of the reference sub-blocks is equal to the number of the second sub-blocks.

5. The method of claim 3, wherein encoding the second sub-blocks further comprises:
    inverting the others of the non-redundant information sub-blocks according to a predetermined standard.

6. The method of claim 5, wherein inverting the others of the non-redundant information sub-blocks comprises:
    inverting the non-redundant information sub-blocks when a total running digital sum (RDS) is greater than a positive value of a first threshold or a current RDS is greater than a positive value of a second threshold, the total RDS indicating an RDS of input streams received from a start time to a current time and the current RDS indicating an RDS of a current input stream;
    inverting the non-redundant information sub-blocks when the total RDS is less than a negative value of the first threshold or the current RDS is less than a negative value of the second threshold; and
    writing an inversion state into the redundant information sub-block.

7. The method of claim 1, further comprising:
    inverting the second sub-blocks according to a predetermined standard to generate the third sub-blocks when all of the first sub-blocks do not correspond to the forbidden pattern.

8. The method of claim 7, wherein inverting the second sub-blocks comprises:
    inverting the second sub-blocks to write the inverted second sub-blocks into the third sub-blocks when a total running digital sum (RDS) is greater than a positive value of a first threshold or a current RDS is greater than a positive value of a second threshold, the total RDS indicating an RDS of input streams received from a start time to a current time and the current RDS indicating an RDS of a current input stream;
    inverting the second sub-blocks to write the inverted second sub-blocks into the third sub-blocks when the total RDS is less than a negative value of the first threshold or the current RDS is less than a negative value of the second threshold; and writing an inversion state into the redundant information sub-block.

9. The method of claim 1, wherein the forbidden pattern has characteristics such that the DC component is greater than a predetermined threshold when one of the first and second sub-blocks is encoded.

10. The method of claim 1, wherein the reference pattern corresponds to a pattern of bit combinations to control the DC component when the second sub-blocks are encoded.

11. A decoding method of a data processing apparatus, comprising:
   partitioning an encoded stream into first sub-blocks and third sub-blocks, the third sub-blocks including a redundant information sub-block and non-redundant information sub-blocks using a decoding apparatus;
   decoding the third sub-blocks based on an encoding state in the redundant information sub-block to generate second sub-blocks when at least one of the first sub-blocks corresponds to a forbidden pattern, the encoding state indicating whether or not the second sub-blocks are encoded using the decoding apparatus; and
   rearranging the first sub-blocks and the second sub-blocks to generate a decoded stream,
   wherein decoding the third sub-blocks comprises obtaining a number of the reference sub-blocks in the redundant information sub-block when the encoding state indicates that the third sub-blocks are encoded, the reference sub-blocks indicating the third sub-blocks that correspond to a reference pattern.

12. The method of claim 11, wherein decoding the third sub-blocks further comprises replacing each of the third sub-blocks into the reference pattern when the number of the reference sub-blocks corresponds to a number of the third sub-blocks.

13. The method of claim 12, wherein decoding the third sub-blocks further comprises:
   obtaining an inversion state from the redundant information sub-block when the number of the reference sub-blocks is less than the number of the third sub-blocks;
   replacing some of the third sub-blocks into the reference pattern based on the number and location of the reference sub-blocks, the some of the third sub-blocks including the redundant information sub-block; and
   inverting others of the third sub-blocks based on the inversion state.

14. The method of claim 11, wherein decoding the third sub-blocks further comprises:
   writing the second sub-blocks based on the third sub-blocks except for the encoding state when the encoding state indicates that the third sub-blocks are not encoded.

15. The method of claim 11, further comprising:
   inverting the third sub-blocks based on an inversion state to generate the second sub-blocks when all of the first sub-blocks do not correspond to the forbidden pattern.

16. The method of claim 15, wherein inverting the third sub-blocks comprises:
   inverting the third sub-blocks except for the inversion state to generate the second sub-blocks when the inversion state indicates that the second sub-blocks are inverted; and
   non-inverting the third sub-blocks to generate the second sub-blocks when the inversion state indicates that the second sub-blocks are not inverted.

17. A data processing apparatus to control a DC component, comprising:
   a data source to provide an input stream; and
   an encoder to encode the input stream to generate an output stream, the encoder comprising:
      a partitioning unit to partition an input stream into first sub-blocks and second sub-blocks;
      an encoding unit to encode the second sub-blocks based on a number and location of reference sub-blocks to generate third sub-blocks when at least one of the first sub-blocks corresponds to a forbidden pattern, the reference sub-blocks indicating the second sub-blocks that correspond to a reference pattern and the third sub-blocks including a redundant information sub-block and non-redundant information sub-blocks; and
   a rearranging unit to rearrange the first sub-blocks and the third sub-blocks to generate an output stream,
   wherein the encoding unit to encode the second sub-blocks comprises:
      a writing unit to write the second sub-blocks into the third sub-blocks when the number of the reference sub-blocks is equal to 0: and
      the writing unit to write a non-encoding state into the redundant information sub-block when the number of the reference sub-blocks is equal to 0, the non-encoding state indicating that the second sub-blocks are not encoded.

18. The data processing apparatus of claim 17, wherein the encoding unit to encode the second sub-blocks comprises:
   a writing unit to write the number and location of the reference sub-blocks and an encoding state into the redundant information sub-block when the number of the reference sub-blocks corresponds to 1, the encoding state indicating that the second sub-blocks are encoded; and
   a storing unit to store non-reference sub-blocks into the non-redundant information sub-blocks when the number of the reference sub-blocks corresponds to 1, the non-reference sub-blocks indicating the second sub-blocks that do not correspond to the reference pattern.

19. The data processing apparatus of claim 18, wherein the encoding unit to encode the second sub-blocks further comprises:
   the writing unit to write the number and location of the reference sub-blocks and the encoding state into the redundant information sub-block and some of the non-redundant information sub-blocks when the number of the reference sub-blocks is not less than 2 and not greater than a number of the third sub-blocks; and
   the writing unit to write the non-reference sub-blocks into others of the non-redundant information sub-blocks when the number of the reference sub-blocks is not less than 2 and not greater than the number of the third sub-blocks.

20. The data processing apparatus of claim 19, wherein the encoding unit to encode the second sub-blocks further comprises:
   the writing unit to write the number of the reference sub-blocks and the encoding state into the redundant information sub-block when the number of the reference sub-blocks is equal to the number of the third sub-blocks; and
   a replacing unit to replace the non-redundant information sub-blocks into a predetermined pattern when the number of the reference sub-blocks is equal to the number of the third sub-blocks.

21. The data processing apparatus of claim 19, wherein the encoding unit to encode the second sub-blocks further comprises:
an inverting unit to invert the others of the non-redundant information sub-blocks according to a predetermined standard.

22. The data processing apparatus of claim 21, wherein the inverting unit to invert the others of the non-redundant information sub-blocks comprises:
the inverting unit to invert the non-redundant information sub-blocks when a total running digital sum (RDS) is greater than a positive value of a first threshold or a current RDS is greater than a positive value of a second threshold, the total RDS indicating an RDS of input streams received from a start time to a current time and the current RDS indicating an RDS of a current input stream;
the inverting unit to invert the non-redundant information sub-blocks when the total RDS is less than a negative value of the first threshold or the current RDS is less than a negative value of the second threshold; and
the writing unit to write an inversion state into the redundant information sub-block.

23. The data processing apparatus of claim 17, further comprising:
an inverting unit to invert the second sub-blocks according to a predetermined standard to generate the third sub-blocks when all of the first sub-blocks do not correspond to the forbidden pattern.

24. The data processing apparatus of claim 23, wherein the inverting unit to invert the second sub-blocks comprises:
the inverting unit to invert the second sub-blocks to write the inverted second sub-blocks into the third sub-blocks when a total running digital sum (RDS) is greater than a positive value of a first threshold or a current RDS is greater than a positive value of a second threshold, the total RDS indicating an RDS of input streams received from a start time to a current time and the current RDS indicating an RDS of a current input stream;
the inverting unit to invert the second sub-blocks to write the inverted second sub-blocks into the third sub-blocks when the total RDS is less than a negative value of the first threshold or the current RDS is less than a negative value of the second threshold; and
a writing unit to write an inversion state into the redundant information sub-block.

25. The data processing apparatus of claim 17, wherein the forbidden pattern has characteristics such that the DC component is greater than a predetermined threshold when one of the first and second sub-blocks is encoded.

26. The data processing apparatus of claim 17, wherein the reference pattern corresponds to a pattern of bit combinations to control the DC component when the second sub-blocks are encoded.

27. A data processing apparatus, comprising:
a partitioning unit to partition an encoded stream into first sub-blocks and third sub-blocks, the third sub-blocks including a redundant information sub-block and non-redundant information sub-blocks;
a decoding unit to decode the third sub-blocks based on an encoding state in the redundant information sub-block to generate second sub-blocks when at least one of the first sub-blocks corresponds to the forbidden pattern, the encoding state indicating whether or not the second sub-blocks are encoded; and
a rearranging unit to rearrange the first sub-blocks and the second sub-blocks to generate a decoded stream,
wherein the decoding unit to decode the third sub-blocks comprises an obtaining unit to obtain the number of the reference sub-blocks in the redundant information sub-block when the encoding state indicates that the third sub-blocks are encoded, the reference sub-blocks indicating the third sub-blocks that correspond to a reference pattern.

28. The data processing apparatus of claim 27, wherein the decoding unit to decode the third sub-blocks further comprises a replacing unit to replace each of the third sub-blocks into the reference pattern when the number of the reference sub-blocks corresponds to a number of the third sub-blocks.

29. The data processing apparatus of claim 28, wherein the decoding unit to decode the third sub-blocks further comprises:
the obtaining unit to obtain an inversion state from the redundant information sub-block when the number of the reference sub-blocks is less than the number of the third sub-blocks;
the replacing unit to replace some of the third sub-blocks into the reference pattern based on the number and location of the reference sub-blocks, the some of the third sub-blocks including the redundant information sub-block; and
an inverting unit to invert others of the third sub-blocks based on the inversion state.

30. The data processing apparatus of claim 27, further comprising:
a writing unit to write the second sub-blocks based on the third sub-blocks except for the encoding state when the encoding state indicates that the third sub-blocks are not encoded.

31. The data processing apparatus of claim 27, further comprising:
an inverting unit to invert the third sub-blocks based on an inversion state to generate the second sub-blocks when all of the first sub-blocks do not correspond to the forbidden pattern.

32. The data processing apparatus of claim 31, wherein the decoding unit to decode the third sub-blocks based on the redundant information to generate the third sub-blocks comprises:
the inverting unit to invert the third sub-blocks except for the inversion state to generate the second sub-blocks when the inversion state indicates that the second sub-blocks are inverted; and
a non-inverting unit to non-invert the third sub-blocks to generate the second sub-blocks when the inversion state indicates that the second sub-blocks are not inverted.

33. A data processing system, comprising:
an encoding apparatus comprising:
an encoding partitioning unit to partition an input stream into a plurality of sets of sub-blocks;
an encoding unit to encode one set of sub-blocks based on a number and a location of reference sub-blocks to generate an additional set of sub-blocks having one or more redundant information sub-blocks and one or more non-redundant information sub-blocks when at least one of an other set of sub-blocks corresponds to a forbidden pattern and to generate an encoded stream; and
a decoding apparatus comprising:
a decoding partitioning unit to partition the encoded stream into the additional set of sub-blocks and the other set of sub-blocks, the additional set of sub-blocks including the one or more redundant information sub-blocks and the one or more non-redundant information sub-blocks; and a decoding unit to decode the additional set of sub-blocks based on an encoding state in the one or more redundant information sub-blocks to generate the one set of sub-blocks when at least one of the other set of sub-blocks corresponds to the forbidden pattern and to generate a decoded stream, wherein the encoding state is indicative of whether the one set of sub-blocks are encoded.

34. A method of operating a data processing system, the method comprising:

partitioning an input stream into a plurality of sets of sub-blocks using an encoding apparatus;

encoding one set of sub-blocks based on a number and a location of reference sub-blocks to generate an additional set of sub-blocks having one or more redundant information sub-blocks and one or more non-redundant information sub-blocks when at least one of an other set of sub-blocks corresponds to a forbidden pattern;

generating an encoded stream;

partitioning the encoded stream into the additional set of sub-blocks having the one or more redundant information sub-blocks and the one or more non-redundant information sub-blocks and the other set of sub-blocks using a decoding apparatus;

decoding the additional set of sub-blocks based on an encoding state indicative of whether the one set of sub-blocks are encoded in the one or more redundant information sub-blocks to generate the one set of sub-blocks when at least one of the other set of sub-blocks corresponds to the forbidden pattern; and generating a decoded stream.

35. A non-transitory computer-readable recording medium having embodied thereon a computer program to execute a method, wherein the method comprises:

partitioning an input stream into a plurality of sets of sub-blocks; and encoding one set of sub-blocks based on a number and a location of reference sub-blocks to generate an additional set of sub-blocks having one or more redundant information sub-blocks and one or more non-redundant information sub-blocks when at least one of an other set of sub-blocks corresponds to a forbidden pattern, wherein when the number of the reference sub-blocks is equal to 0, encoding the second sub-blocks comprises:

writing the second sub-blocks into the third sub-blocks; and writing a non-encoding state into the redundant information sub-block, the non-encoding state indicating that the second sub-blocks are not encoded.

* * * * *